(12) United States Patent  
Espinoza et al.

(10) Patent No.: US 7,541,310 B2  
(45) Date of Patent: Jun. 2, 2009

(54) SILICA-ALUMINA CATALYST SUPPORT, CATALYSTS MADE THEREFROM AND METHODS OF MAKING AND USING SAME

(75) Inventors: Rafael L. Espinoza, Ponca City, OK (US); Kandaswamy Jothimurugesan, Ponca City, OK (US); Kevin L. Coy, Ponca City, OK (US); James Dale Ortego, Jr., Ponca City, OK (US); Nithya Srinivasan, Ponca City, OK (US); Olga P. Ionkina, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 799 days.

(21) Appl. No.: 10/962,702

(22) Filed: Oct. 12, 2004

(65) Prior Publication Data

US 2005/0119116 A1 Jun. 2, 2005

Related U.S. Application Data

(60) Provisional application No. 60/511,976, filed on Oct. 16, 2003.

(51) Int. Cl.
*B01J 23/00* (2006.01)
*B01J 21/00* (2006.01)
*B01J 29/00* (2006.01)
*B01J 20/00* (2006.01)

(52) U.S. Cl. .................. 502/326; 502/260; 502/263; 502/314; 502/315; 502/316; 502/327; 502/332; 502/333; 502/334; 502/347; 502/348; 502/349; 502/350; 502/351; 502/355; 502/407; 502/415; 502/439

(58) Field of Classification Search ................. 502/314, 502/315, 316, 326, 327, 260, 263, 332, 333, 502/334, 347, 348, 349, 350, 351, 407, 415, 502/355, 439

See application file for complete search history.

(56) References Cited

U.S. PATENT DOCUMENTS 2,890,178 A 6/1959 Thorn et al.

(Continued)

FOREIGN PATENT DOCUMENTS

GB 640965 8/1950

(Continued)

OTHER PUBLICATIONS

ALCOA World Chemical; "High purity, high density, boehmite aluminas"; ALCOA Product Data USA/6070-RO4/0801; 2 pages.

(Continued)

*Primary Examiner*—Cam N. Nguyen

(57) ABSTRACT

This invention relates to catalysts comprising a catalytic metal deposited on a composite support with well-dispersed chemical "anchor" species acting as nucleation centers for catalytic metal crystallites growth. The catalysts have the advantage that the average catalytic metal crystallite size can be controlled by the molar ratio of catalytic metal to chemical "anchor," and is not limited by the porous structure of the support. A preferred embodiment comprises a cobalt-based catalyst on a silica-alumina support made by a co-gel method, wherein its average pore size can be controlled by the pH. The alumina species in the support most likely serve as chemical "anchors" to control the dispersion of cobalt species, such that the average cobalt crystallite size can be greater than the average pore size.

19 Claims, 2 Drawing Sheets

U.S. PATENT DOCUMENTS

| | | | |
|---|---|---|---|
| 2,892,858 A | 6/1959 | Ziegler | |
| 3,055,840 A | 9/1962 | Koch, Jr. | |
| 3,089,845 A | 5/1963 | Mosely | |
| 3,726,790 A * | 4/1973 | Gallagher et al. | 208/111.3 |
| 3,852,190 A | 12/1974 | Buss et al. | |
| 3,894,963 A | 7/1975 | Gerdes et al. | |
| 4,012,313 A | 3/1977 | Buss et al. | |
| 4,063,851 A | 12/1977 | Weldon | |
| 4,115,255 A * | 9/1978 | Hayes et al. | 208/143 |
| 4,151,121 A | 4/1979 | Gladrow | |
| 4,224,192 A | 9/1980 | Foster et al. | |
| 4,387,085 A | 6/1983 | Fanelli et al. | |
| 4,429,159 A | 1/1984 | Cutchens et al. | |
| 4,602,000 A | 7/1986 | Dupin et al. | |
| 4,617,183 A | 10/1986 | Lewis et al. | |
| 4,708,945 A | 11/1987 | Murrell et al. | |
| 4,744,974 A | 5/1988 | Lewis et al. | |
| 4,778,588 A | 10/1988 | Brandes et al. | |
| 4,831,007 A | 5/1989 | Murrell et al. | |
| 4,870,044 A | 9/1989 | Kukes et al. | |
| 4,891,127 A | 1/1990 | Murrell et al. | |
| 5,008,234 A | 4/1991 | Ozin et al. | |
| 5,055,019 A | 10/1991 | Meyer et al. | |
| 5,059,574 A | 10/1991 | Abrevaya | |
| 5,102,851 A | 4/1992 | Eri et al. | |
| 5,116,879 A | 5/1992 | Eri et al. | |
| 5,134,107 A | 7/1992 | Narula | |
| 5,232,580 A | 8/1993 | Le et al. | |
| 5,837,634 A | 11/1998 | McLaughlin et al. | |
| 5,874,381 A | 2/1999 | Bonne et al. | |
| 5,935,420 A * | 8/1999 | Baird et al. | 208/213 |
| 5,939,350 A | 8/1999 | Singleton et al. | |
| 6,063,358 A | 5/2000 | Lindquist et al. | |
| 6,100,304 A | 8/2000 | Singleton et al. | |
| 6,224,846 B1 | 5/2001 | Hurlburt et al. | |
| 6,255,358 B1 | 7/2001 | Singleton et al. | |
| 6,262,132 B1 | 7/2001 | Singleton et al. | |
| 6,271,432 B2 | 8/2001 | Singleton et al. | |
| 6,303,531 B1 | 10/2001 | Lussier et al. | |
| 6,333,294 B1 | 12/2001 | Chao et al. | |
| 6,335,305 B1 * | 1/2002 | Suzuki et al. | 502/325 |
| 6,342,191 B1 | 1/2002 | Kepner et al. | |
| 6,465,530 B2 | 10/2002 | Roy-Auberger et al. | |
| 6,503,867 B1 | 1/2003 | Stamires et al. | |
| 6,555,496 B1 | 4/2003 | Stamires et al. | |
| 6,806,226 B2 | 10/2004 | Van Berge et al. | |
| 6,835,690 B2 | 12/2004 | Van Berge et al. | |
| 7,176,160 B2 * | 2/2007 | Espinoza et al. | 502/327 |
| 7,341,976 B2 * | 3/2008 | Espinoza et al. | 502/327 |
| 7,368,625 B2 * | 5/2008 | Lok et al. | 585/733 |
| 2002/0155946 A1 | 10/2002 | Bogdan et al. | |
| 2002/0192155 A1 | 12/2002 | Sterte et al. | |
| 2003/0027875 A1 | 2/2003 | Zhang et al. | |
| 2003/0032554 A1 | 2/2003 | Park et al. | |
| 2003/0114543 A1 | 6/2003 | Zhang et al. | |
| 2003/0162849 A1 | 8/2003 | Van Berge et al. | |
| 2004/0186188 A1 | 9/2004 | Van Berge et al. | |

FOREIGN PATENT DOCUMENTS

| | | |
|---|---|---|
| GB | 2 352 194 A | 1/2001 |
| WO | WO 99/42214 | 8/1999 |
| WO | WO 00/45948 | 8/2000 |
| WO | WO 01/76735 A1 | 10/2001 |
| WO | WO 01/87480 A1 | 11/2001 |
| WO | WO 02/07883 A2 | 1/2002 |
| WO | WO 03/012008 A2 | 2/2003 |
| ZA | 2001/6213 | 7/2001 |

OTHER PUBLICATIONS

ALCOA World Chemical; "High purity, high density, gamma phase alumina"; ALCOA Product Data Sheet USA/6080-RO2/0601; 2 pages.

Condea; "High purity activated aluminas Puralox, Catalox"; Product Information Sheet Oct. 1999; 6 pages.

Rong-Sheng Zhou, et al.; "Structures and Transformation Mechanisms of the η, γ and θ Transition Aluminas"; International Union of Crystallography 1991; Institute for Ceraminc Superconductivity, New York State College of Ceramics, Alfred University, Alfred, NY 14802, USA; pp. 617-630.

Richard L. Smith, et al.; "The Influence of Diaspore Seeding and Chlordie Concentration on the Transformation of 'Diasporic' Precursors to Corundum"; Journal of the American Ceramic Society, Oct. 16, 2000; 31 pages.

S. Matsuda, et al.; "A New Support Material for Catalytic Combustion Above 1000 C"; 8th International Congress on Catalysis; vol. IV: Impact of surface science on catalysis, structure-selectivity/activity correlations, new routes for catalyst synthesis, pp. IV-879-IV-889.

H.C. Stumpf, et al.; "Thermal Transformations of Aluminas and Alumina Hydrates"; Industrial and Engineering Chemistry, vol. 42, No. 7, Jul. 1950; pp. 1398-1403.

Shu-Hui Cai, et al.; "Atomic Scale Mechanism of the Transformation of γ-Alumina to θ-Alumina"; The American Physical Society 2002; Physical Review Letters, vol. 89, No. 23; Dec. 2, 2002; 4 pages.

Zhong-Wen Liu, et al.; "Partial Oxidation of Methane Over Nickel Catalysts Supported on Various Aluminas"; Korean J. Chem. Eng., vol. 19, No. 5, pp. 735-741 (2002).

Hyun-Seog Roh, et al.; "Partial Oxidation of Methane Over Ni/θ-$Al_2O_3$ Catalysts"; Chemistry Letters 2001; Mar. 19, 2001; pp. 666-667.

Hyun-Seog Roh, et al.; "Partial Oxidation of Methane Over Ni/Ce-$ZrO_2$/θ-$Al_2O_3$"; Korean J. CHem. Eng., vol. 19, No. 5; pp. 742-748 (2002).

Hiromichi Arai, et al.; "Thermal stabilization of catalysts supports and their application to high-temperature catalytic combustion"; Applied Catalysis A: General 138 (1996); pp. 161-176; Elsevier Science Publishers B.V., Amsterdam.

Bernard Béguin et al.; "Stabilization of alumina by addition of lanthanum"; Applied Catalysis A: General 75 (1991); pp. 119-132; Elsevier Science Publishers B.V., Amsterdam.

François Oudet, et al.; "Thermal Stabilization of Transition Alumina by Structural Coherence with $LnAIO3$ (Ln=La, Pr, Nd)"; Journal of Catalysts vol. 114; pp. 112-120 (1988).

H. Schaper, et al.; "The Influence of Lanthanum Oxide on the Thermal Stability of Gamma Alumina Catalyst Supports"; Applied Catalysis, vol. 7 (1983), pp. 211-220; Elsevier Science Publishers B.V., Amsterdam.

Jalajakumari Nair, et al.; "Pore Structure Evolution of Lanthana-Alumina Systems Prepared Through Coprecipitation"; J. Am Ceram. Soc., vol. 83, No. 8; pp. 1942-1946 (2000).

S. N. Rashkeev, et al.; "Transition metal atoms on different alumina phases: The role of subsurface sites on catalytic activity"; Physical Review B, vol. 67, No. 115414; 4 pages.

Hennie Schaper, et al.; "Thermal Stabilization of High Surface Area Lumina"; Solid State Ionics, vol. 16 (1985), pp. 261-265.

Xiaoyin Chen, et al.; "High temperature stabilization of alumina modified b lanthanum species"; Applied Catalysis A: General, vol. 205 (2001); pp. 159-172.

S. Subramanian, et al.; "Characterization of lanthana/alumina composite oxides"; Journal of Molecular Catalysis, vol. 69 (1991); pp. 235-245.

P. Souza Santos, et al.; "Standard Transition Aluminas. Electron Microscopy Studies"; Materials Research, vol. 3, No. 4; pp. 104-114, 2000.

E. Iglesia, et al.; "Computer-Aided Design of Catalysts," ed. E.R. Becker et al., p. 215-225, New York, Marcel Decker, Inc., 1993.

H. Pham, et al.; "The synthesis of attrition resistant slurry phase iron Fischer-Tropsch catalysts," Catalysis Today, vol. 58 (2000), pp. 233-240.

Database CAPLUS on STN, Chemical Abstract (Columbus, Ohio, USA), An 2000:795147. Van De Loosdrecht et al., *Support Modification for Cobalt Based Slurry Phase Fischer-Tropsch Catalysts*. American Chemical Society (2000), 220th, Fuel 048.

Ihns Schulz; Short History and Present Trends of Fischer-Tropsch Synthesis; Abstract; Universiot Karlsruhe, Germany; 10 pages.

M. Absi-Halabi, et al.; "Studies of Pore Size Control of Alumina: Preparation of Alumina Catalyst Extrudates with Large Unimodal Pore Structure by Low Temperature Hydrothermal Treatment"; Preparation of Catalysts V, 1991 Elsevier Science Publishers B.V., Amsterdam, pp. 155-163.

Database CAPLUS on STN, Wei et al. *Microstructure of Al2O3-SiO2 Composite Membranes Prepared by Sol-gel Technique*, Guisuanyan Zuebao (2001), 29(4), 392-396.

PCT International Search Report International Application No. PCT/US04/34414 dated Jan. 5, 2005 (2 p.).

Ruud Snel, *Control of the Porous Structure of Amorphous Silica-Alumina*. Applied Catalysis, 11 (1984) 271-280.

R. L. Espinoza et al., *Catalytic Oligomerization of Ethene Over Nickel-Exchanged Amorphous Silica-Aluminas; Effect of the Acid Strength of the Support*, Applied Catalysis, 29 (1987) 295-303.

PCT International Search Report for International Application No. PCT/US4/33541 dated Jun. 2, 2005 (4 p.).

Mark R.A. Manton et al., *Controlled Pore Sizes and Active Site Spacings Determining Selectivity in Amorphous Silica-Alumina Catalysts*, Journal of Catalysis 60 (1979) pp. 156-166.

* cited by examiner $cs = 4.6347 \, Ln(SAR) - 8.8093$ $d = -3.6094 \, Ln(SAR) + 27.473$

SILICA-ALUMINA CATALYST SUPPORT, CATALYSTS MADE THEREFROM AND METHODS OF MAKING AND USING SAME

CROSS-REFERENCE TO RELATED APPLICATIONS

This non-provisional application claims the benefit of U.S. provisional application No. 60/511,976, filed Oct. 16, 2003, which is hereby incorporated by reference in its entirety.

FIELD OF THE INVENTION

The present invention relates generally to a catalyst that includes an amorphous silica-alumina support prepared by a method that includes utilizing a chemical "anchor" to influence the metal dispersion and metal crystallite size. The catalyst has the advantage that the dispersion is controlled by the molar ratio of silica to alumina in the support independently of the porous structure of the support. The present invention further relates to the use of the catalyst in the Fischer-Tropsch reaction.

BACKGROUND OF THE INVENTION

Natural gas found in deposits in the earth is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is usually transported large distances from the wellhead to commercial destinations in pipelines. This transportation presents technological challenges due in part to the large volume occupied by the gas. Because the volume of a gas is so much greater than the volume of a liquid containing the same number of molecules, the process of transporting natural gas typically includes chilling and/or pressurizing the natural gas in order to liquefy it. Unfortunately, this liquefaction contributes to the final cost of the natural gas.

Further, naturally occurring sources of crude oil used for liquid fuels, such as gasoline and middle distillates, have been decreasing, and supplies are not expected to meet demand in the coming years. Middle distillates typically include heating oil, jet fuel, diesel fuel, and kerosene. Because those fuels are liquid under standard atmospheric conditions, they have the advantage that in addition to their value, they do not require the energy, equipment, and expense of the liquefaction process. Thus, they can be transported more easily in a pipeline than natural gas.

Therefore, for all of the above-described reasons, there has been an interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane (the major chemical component of natural gas) is reacted with oxygen to form synthesis gas (syngas), which is a combination of carbon monoxide gas and hydrogen gas. In the second transformation, known as the Fischer-Tropsch process, carbon monoxide is reacted with hydrogen to form organic molecules known as hydrocarbons, which contain carbon and hydrogen atoms. Other organic molecules known as oxygenates, which contain oxygen in addition to carbon and hydrogen, also may be formed during the Fischer-Tropsch process.

The Fischer-Tropsch product stream commonly contains a range of hydrocarbons, including gases, liquids, and waxes. It is desirable to primarily obtain hydrocarbons that are liquids and waxes, e.g., $C_5^+$ hydrocarbons that may be processed to produce fuels. For example, the hydrocarbon liquids may be processed to yield gasoline, as well as heavier middle distillates. The hydrocarbon waxes may be subjected to additional processing steps for conversion to liquid hydrocarbons.

The Fischer-Tropsch process is commonly facilitated by a catalyst having the function of increasing the rate of reaction without being consumed by the reaction. A feed containing syngas is contacted with the catalyst in a reaction zone that may include one or more reactors. Common catalysts for use in the Fischer-Tropsch process contain at least one catalytic metal from Groups 8, 9, or 10 of the Periodic Table (based on the new IUPAC notation, which is used throughout the present specification). Cobalt metal is a particularly desirable catalytic metal in catalysts that are used to convert natural gas to heavy hydrocarbons suitable for the production of diesel fuel. Alternatively, iron, nickel, and ruthenium have served as the catalytic metal. Nickel catalysts favor termination and are useful for aiding the selective production of methane from syngas. Iron has the advantage of being readily available and relatively inexpensive but the disadvantage of a high water-gas shift activity. Ruthenium has the advantage of high activity but is quite expensive.

The catalysts often further employ a promoter in conjunction with the principal catalytic metal. A promoter typically improves one or more measures of the performance of a catalyst, such as activity, stability, selectivity, reducibility, or regenerability. In addition to the catalytic metal, a Fischer-Tropsch catalyst often includes a support. The support is typically a porous material that provides mechanical support and a high surface area upon which the catalytic metal and any promoter are deposited.

The method of preparation of a catalyst may influence the performance of the catalyst in the Fischer-Tropsch reaction. In a common method of loading the catalytic metal to a support, the support is impregnated with a solution containing a dissolved metal-containing compound. When a promoter is used, an impregnation solution may further contain a promoter-containing compound. After drying the support, the resulting catalyst precursor is calcined, typically by heating in an oxidizing atmosphere, to decompose the metal-containing compound to a metal oxide. The preparation of the catalyst may include more than one impregnation, drying, and calcination cycle. When the catalytic metal is cobalt, the catalyst precursor is then typically reduced in hydrogen to convert the oxide compound to reduced "metallic" metal. When the catalyst includes a promoter, the reduction conditions may cause reduction of the promoter, or the promoter may remain as an oxide compound. As a result of the method described above, the catalyst precursor becomes an activated catalyst capable of facilitating the conversion of syngas to hydrocarbons having varying numbers of carbon atoms and thus having a range of molecular weights.

Catalyst supports employed for the Fischer-Tropsch process have typically been refractory oxides (e.g., silica, alumina, titania, thoria, zirconia or mixtures thereof, such as silica-alumina). It has been asserted that the Fischer-Tropsch reaction is only weakly dependent on the chemical identity of the metal oxide support (see E. Iglesia et al. 1993, In: "Computer-Aided Design of Catalysts," ed. E. R. Becker et al., p. 215, New York, Marcel Dekker, Inc.). Nevertheless, because it continues to be desirable to improve the activity of Fischer-Tropsch catalysts, other types of catalyst supports are being investigated. The physical characteristics of a supported catalyst tend to influence the performance of the catalyst. In particular, the dispersion of the catalytic metal may influence the performance of a supported catalyst. Lower dispersion does not fully utilize metal sites and is not an efficient use of the available metal. In contrast, high dispersion of catalytic metal more fully utilizes metal sites and results in a higher initial catalyst activity, such as carbon monoxide conversion in the Fischer-Tropsch reaction. However, highly dispersed metal tends to be more difficult to reduce and tends to deactivate more rapidly.

Support acidity is another factor contributing to the efficacy of catalyst supports and the catalysts made therefrom. The acidity of a catalyst support can manifest itself as Bronsted or Lewis acidity by the presence of bonded protons or electron deficient centers, respectively. Such acidity can have a two-fold effect upon catalysts made therefrom. The acidity of a support upon which a catalytic metal is dispersed may influence the nature of the resulting dispersion of metal. Secondly, an acidic catalyst support in the presence of a dispersed catalytic metal results in a bifunctional catalyst. Such bifunctional catalysts usually find utility in various hydroprocessing catalysts, but it seems according to some in the art that varying surface acidity present in some combinations of support and metal, i.e., ruthenium on titania, does affect catalyst activity in hydrocarbon synthesis processes. One method to measure support acidity has been proposed by R. L. Espinoza et al. in "Catalytic Oligimerization of Ethene over Nickel-Exchanged Amorphous Silica-Alumina: Effect of the Acid Strength of the Support," Applied Catalysis 29, pp. 295-303 (1987), hereby incorporated by reference herein to the extent that it discloses such method. In Espinoza et al. (1987), the acidity index is proposed to quantify the acidity found on the exposed surface of a catalyst support. The acidity index preferably is determined according to the procedure that R. L. Espinoza et al. described.

Thus, it is desirable to control the dispersion of metal for supported metal catalysts. Methods for controlling dispersion typically involve a modification of the method of depositing metal on the support. For example, methods of affecting the dispersion of a catalytic metal include controlling the evaporation rate of the solvent (e.g. water) used to dissolve the metal precursor (e.g. nitrates or acetates of Fe, Co, Ru, and the like) whether achieved by varying the temperature or pressure. Other techniques for adjusting dispersion include using solvents with higher or lower boiling points than water. Further, chemical vapor deposition is a well-known technique for controlling the final dispersion of metal.

Alternatively, a method for controlling the dispersion may include selecting the catalyst support material. Although catalyst supports are desirably inert, it is known that the identity of a support may influence the dispersion of metal deposited on the support. For example, metal deposited on alumina tends to be characterized by higher dispersion than metal deposited on silica.

Varying the average pore diameter of the support is another technique to control dispersion. In general, a correlation is present between the average pore size of the support and the average metal or oxide crystallite size. Due to steric constraints, the metal or oxide crystallite size cannot be larger than the pore, although it may be smaller. This technique has the disadvantage that, in order to control the average metal or oxide crystallite size, the average pore size has to be manipulated. This may result in negative effects such as diffusional constraints, low support surface areas or lower support mechanical strength, among others.

Thus, there remains a need for supported catalysts having controlled dispersion of catalytic metals or oxides and methods of making such catalysts.

SUMMARY OF THE INVENTION

According to a preferred embodiment of the present invention, an effective catalyst comprises a composite support prepared by a method that utilizes the concept of chemical "anchors" to influence the dispersion and availability of active metal sites. The inventors have discovered that the dispersion of the catalytic metal upon said composite support may be controlled by the proper selection during the catalyst synthesis of the molar ratio of active metal species to chemical "anchors." For a given desirable active metal loading, the dispersion of the catalytic metal upon a support is therefore correlated to the amount of chemical "anchors" disposed on the composite support. In contrast to the prior art, the present invention discloses that the dispersion of the catalytic metal may be influenced by factors independent of the support morphology and is therefore not limited by the average pore size of the composite support. In particular, it has been discovered that the dispersion of a catalytic metal upon a composite support may be influenced by the composition of said support. An embodiment relates to a cobalt-based catalyst supported on an amorphous silica-alumina, wherein the average cobalt crystallite size is controlled by the molar ratio of cobalt to alumina. In particular, the inventors have discovered that the dispersion of a catalytic metal or catalytic metal oxide upon a support depends on the molar ratio of silica to alumina in the amorphous support, not on morphological factors such as average pore size diameter, surface area and pore volume.

The present invention relates to a support, method of making the support, a catalyst, and process for producing hydrocarbons that have the advantage that the activity of the catalyst can be optimized by selecting a desirable average pore size of the support for effective reactant/product diffusion in and out of the pores (kinetic control versus mass transfer control) and by selecting a specific support composition, which allows control of the catalytic metal dispersion.

The present inventors have surprisingly discovered that, when employing the method of making the catalyst according to this invention, a supported catalyst comprising a support and catalytic metal crystallites deposited on said support can be generated, wherein the average size of said metal crystallites is not limited by the average pore size of the support. The average crystallite size can be greater than the average pore size of the support.

While not wishing to be limited by the present interpretation, it is believed by the present inventors that the dispersion of the metal on the support is controlled by controlling the availability of aluminum atoms that act as "anchors" for the formation of metal crystallites wherein anchors as used herein means sites effective for directing the growth of metal crystallites upon the support surface. According to the chemical "anchors" concept of this invention, it is the molar ratio of active metal to chemical "anchor," that can influence at least in part the number and size of catalytic metal crystallites and thus the catalytic metal dispersion. According to the present invention, for a given catalytic metal loading, it is the silica/alumina molar ratio that can influence the concentration of alumina sites thereby exercising at least partial control over the catalytic metal dispersion. The inventors believe that their findings using such a silica-alumina system can also apply to other composite supports comprising acid sites, particularly weak acid sites such as other mixed metal oxide systems.

The chemical "anchor" can comprise acid sites, for example weak or strong acid sites from inorganic mixed oxides.

In other embodiments, the invention also includes a method of making a catalyst comprising a catalytic metal and a composite support of a desirable pore size, wherein the composition of the composite support and not its average pore size controls the average crystallite size of the catalytic metal deposited on said composite support such that a catalyst with improved catalytic performance is made. The method comprises forming a mixture comprising precursors of a first element and a second element in a manner effective to distribute species of said second element amongst species of said first element; treating said mixture so as to form a porous composite support with a desirable average pore, wherein the porous composite support comprises a molar ratio of the first element to the second element between about 3:1 and about 1,000:1; applying a compound of a catalytic metal to said porous composite support to form a catalyst precursor; and treating said catalyst precursor so as to form a catalyst comprising catalytic metal crystallites of an average crystallite size, wherein the catalyst comprises a molar ratio of catalytic metal to second element between about 2:1 and about 1,000:1, and wherein the average crystallite size is controlled by the molar ratio of catalytic metal to second element and is not limited by the average pore size of said porous composite support. Forming a mixture comprises mixing a precursor of said first element and a precursor of said second element in a solvent so as to form a mixture and adding an acid to said mixture so as to form a hydrogel, and aging the hydrogel. Treating may also comprise contacting with an ion-exchange solution and washing the gel. Treating preferably comprises drying and calcining so as to form said amorphous composite support. Preferably, species of said first element and said second element form covalently-bound complexes. These covalently-bound complexes preferably have some ion-exchange capacity, which is useful for binding of catalytic metal species to these complexes. These covalently-bound complexes may be in the form of $M_1$-O-$M_2$, wherein $M_1$ represents the first element; $M_2$ the second element; and O an oxygen atom. These covalently-bound complexes are preferably acidic and more preferably comprise $H_3O^+$ cations. The first element and the second element are preferably distinct from one another. The first element can comprise one or more elements from silicon, titanium, zirconium, thorium, cerium, aluminum, boron, or oxides thereof. The second element may comprise aluminum, zirconium, titanium, tungsten, molybdenum, sulfate, boron, gallium, scandium, oxides thereof, or combinations thereof. In some embodiments, the second element may comprise aluminum, tungsten, molybdenum, sulfate, boron, gallium, scandium, oxides thereof, or combinations thereof. In preferred embodiments, the first element comprises silicon or silica, while the second element comprises aluminum or alumina. In alternate embodiments, the first element comprises zirconium or zirconia, while the second element comprises titanium or titania, or vise versa.

The invention further relates to a catalyst comprising a porous composite support comprising a first element and a second element with a molar ratio of the first element to the second element between about 3:1 and about 1,000:1; and a catalytic metal comprising catalytic metal crystallites deposited on said support, wherein the support is made in a manner effective in distributing species of said second element amongst species of said first element; wherein the catalyst has a molar ratio of catalytic metal to said second element between about 2:1 and about 1,000:1; and further wherein species of said second metal serve as nucleation centers for said catalytic metal crystallites.

A particular embodiment comprises a cobalt Fischer-Tropsch catalyst. The Fischer-Tropsch cobalt-based catalyst includes an amorphous silica-alumina support and cobalt crystallites with an average crystallite size deposited on said support, wherein the average cobalt crystallite size is greater than the average pore size. The catalyst has a molar ratio of cobalt to alumina between about 2:1 and about 1,000:1. The support has a molar ratio of silica to alumina between about 3:1 and about 1,000:1; an average pore size between about 5 nm and about 20 nm; and a surface area greater than about 260 $m^2/g$. The average cobalt crystallite size is preferably between about 6 nm and about 25 nm.

Thus, each of the preferred embodiments of the present invention comprises a combination of features and advantages that enable it to overcome various problems of conventional catalysts and processes. The various characteristics described above, as well as other features, will be readily apparent to those skilled in the art upon reading the following detailed description of the preferred embodiments of the invention and by referring to the accompanying examples.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

Catalyst Support

Figure 1:
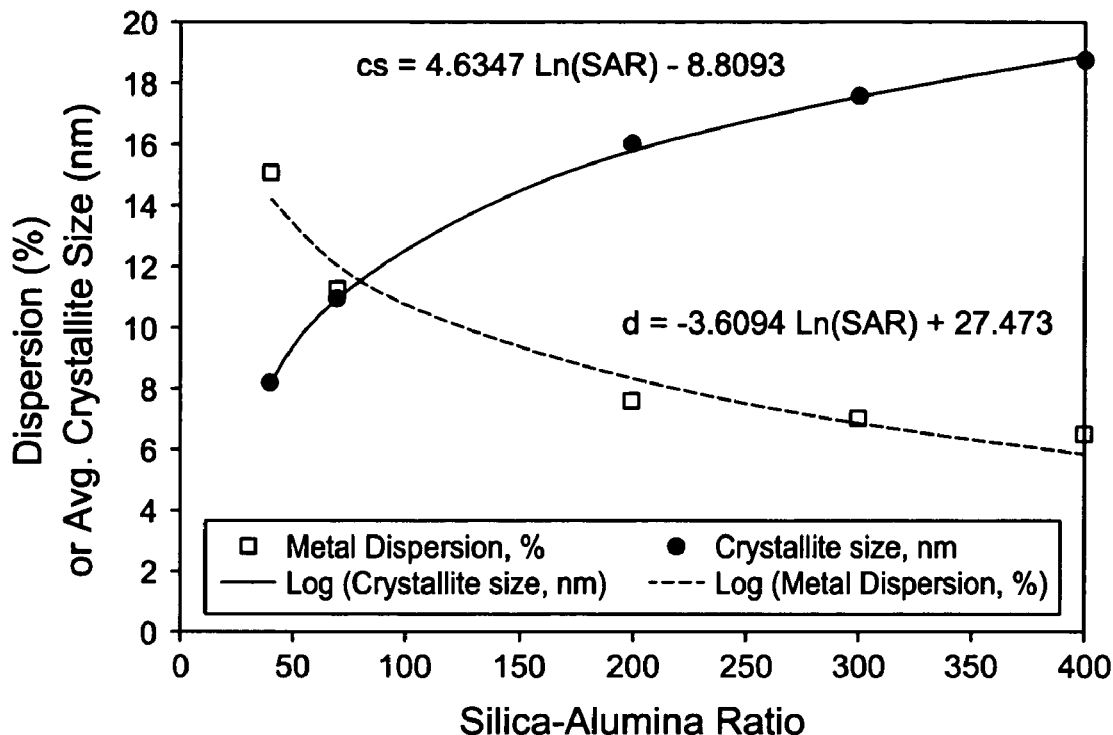
FIG. 1 is a plot of cobalt dispersion as a function of the molar ratio of silica to alumina for cobalt-based catalysts supported on silica-alumina supports with an average pore size of 8 nm.

A catalyst according to a preferred embodiment of the invention comprises an amorphous silica-alumina support. The present inventors have discovered that, for a catalyst comprising a catalytic metal and a silica-alumina support with a desirable average pore size, there is a direct correlation between catalytic metal dispersion and the molar ratio of silica to alumina, which indicates that the average size of catalytic metal crystallites on the support can be controlled by the silica-to-alumina molar ratio of the support and not limited by or dependent on the average pore size of the support. This correlation is observed in supports made by a precipitation method, which comprises making a silica-alumina gel. According to a preferred embodiment, the amorphous silica-alumina gel has a silica-to-alumina molar ratio preferably in the range of from about 3:1 to about 1,000:1, more preferably from about 30:1 to about 500:1, still more preferably from about 40:1 to about 400:1. The amorphous silica-alumina gel is made by a method that includes selecting the gelation pH according to the silica-to-alumina molar ratio. By varying the gelation pH according to the silica alumina ratio, a desirable average pore size of the support can be obtained.

The present inventors have discovered that, in the absence of control of the gelation pH in the formation of an amorphous silica-alumina support, the dispersion of metal deposited on the support depends on other properties of the support in addition to the molar ratio of silica to alumina. In particular, the metal dispersion depends additionally on the porous structure of the amorphous silica-alumina. For amorphous silica-alumina materials formed with a preselected pH, the porous structure varies with the silica-to-alumina molar ratio. As the silica-to-alumina ratio increases, the average pore size of the support also increases. In contrast, it has been found by the present inventors that, if an average pore size of the support is particularly desirable and one wishes to obtain this desirable average pore size regardless of the silica-to-alumina molar ratio, then adjustment of the gelation pH during the formation of the silica-alumina gel can be done in order to achieve the desirable porous structure. For example, as the selected silica-to-alumina molar ratio increases, the gelation pH may decrease to obtain the same average pore size of the silica-alumina support. Thus, the present inventors have found that the average pore size of the silica-alumina amorphous support can be controlled by adjusting the gelation pH during the formation of an amorphous-silica support and that the dispersion of a catalytic metal on the support can be controlled by the silica-to-alumina ratio for a given metal loading or by the catalytic metal-to-alumina ratio. Further, the gelation pH is preferably selected according to the relationship pH=a+b ln (SAR), wherein pH is the gelation pH and SAR is the silica-to-alumina molar ratio. The intercept a and the slope b are preferably selected so as to control the porous structure of the silica-alumina material. For example, if it is desirable to obtain a porous structure of the silica-alumina material with an average pore size of 8 nanometers, then the pH is selected such that the intercept a is equal to −0.1522 and the slope b is equal to 11.295. This pH adjustment to control average pore size of the gel is a modification of conventional precipitation preparation methods. For example, a method of preparing an amorphous silica-alumina is described in R. Snel, "Control of the Porous Structure of Amorphous Silica-Alumina I. The Effects of Sodium Ions and Syneresis," Applied Catalysis 11, pp. 271-280 (1984), hereby incorporated by reference to the extent that it discloses such methods. Suitable alternative conventional precipitation methods are contemplated as long as the preselected silica-to-alumina molar ratio is used and as long as one can modify the average pore size of the silica-alumina precursor without affecting the desired silica-to-alumina molar ratio.

Further, the present inventors have surprisingly discovered that, when employing the method according to this invention, a supported catalyst comprising a support and catalytic metal crystallites deposited on said support can be generated, wherein the average size of said metal crystallites is not limited by the average pore size of the support. Therefore, the Applicants have discovered that one can tailor the average crystallite size within a desirable range and control the distribution of pore sizes independently of each other. Thus, this independent tailoring of metal dispersion from porous structure and the control of pore structure enables an optimization of catalytic performance of these supported catalysts. This method is particularly useful for making catalysts that employ a significant weight fraction of catalytic metal (i.e., greater than about 5 wt. %) and for which the rate of reaction may be limited by mass transfer due to a limited pore diffusion of reactants and/or products. However, this method may also be useful for making catalysts that employ a small weight fraction of catalytic metal (i.e., less than about 5 wt. %), as long as the catalytic metal-to-chemical "anchor" molar ratio is greater than 2:1. With small catalytic metal loading, the silica-to-alumina ratio may be larger than 40:1, preferably more than 100:1, but still below 1,000:1. A specific application is the making of Fischer-Tropsch catalysts based on cobalt, iron, or ruthenium, and their use in the synthesis of hydrocarbons with 5 or more carbon atoms from synthesis gas.

Without being limited by theory, it is believed by the present inventors that the dispersion of the metal on the support is controlled by controlling the availability of alumina sites that act as chemical "anchors" for the initial deposition of a first catalytic metal atom and as nucleation sites for the formation of metal crystallites. For example, the mechanism may comprise one of an initial binding by ion exchange and a metal-metal interaction. The initial binding by ion exchange helps attaching a first metal species to one chemical "anchor" on the support; and the metal-metal interaction subsequently helps deposit more metal species to said first metal species bound to the chemical "anchor" to form a metal agglomerate, also called metal crystallite.

Without being limited by theory, the Applicants further believe that it is most likely the acidity of formed complexes comprising aluminum, which are distributed amongst the silica species and are therefore present on the support surface to form alumina sites, that provides the ion-exchange capacity to attract the catalytic metal species. Therefore, the concentration of aluminum-comprising complexes (i.e., alumina sites) is controlled by the silica-to-alumina molar ratio of the silica-alumina material. The formed complexes may comprise hydroxyl groups bridging a silicon species and an aluminum species, such as Si—O—Al. Therefore, for a given pore structure, the silica-to-alumina molar ratio for a given catalytic metal loading (i.e., the catalytic metal-to alumina molar ratio) influences the average crystallite size and thus the dispersion of the catalytic metal. Thus, the method of making the support controls the distribution of the alumina sites amongst the silica species (for optimal metal dispersion) and the support structure (for optimal pore diffusion).

The silica-to-alumina molar ratio of the support according to this invention is preferably in the range of from about 3:1 to about 1,000:1, more preferably from about 30:1 to about 500:1, still more preferably from about 40:1 to about 400:1.

In an embodiment, a basic aluminum source and a basic silicon source are co-precipitated with the addition of acid. The precipitation method preferably comprises (a) mixing a basic silicon source and a basic aluminum source so as to form a sol corresponding to a silica-to-alumina molar ratio; (b) adding an acid to form a gel and to adjust the gelation pH of the gel so as to obtain an average pore size of the gel within a desirable range; and (c) treating said gel so as to form the amorphous silica-alumina support. The basic aluminum source is preferably an aluminate such as sodium aluminate. The gel may also be called hydrogel. Other suitable basic aluminum sources include aluminum hydroxide. The basic silicon source is preferably a silicate compound such as sodium silicate. Other suitable basic silicon sources include tetraethylorthosilicate. The acid is preferably nitric acid. Other suitable acids include acetic acid or formic acid. Preferably, acid is added to the basic silicon and aluminum sources until a desired gelation pH is attained. When the silica-to-alumina ratio is between about 3:1 and about 1,000:

1, the gelation pH is preferably greater than 10 and more preferably between 10 and 11 to allow the formation of a gel with an average pore size within a desirable range. The desirable range of average pore size may be between about 3 nm and about 60 nm but is preferably between about 5 nm and about 20 nm. The average pore size of the silica-alumina gel is quite sensitive to the gelation pH, and very small pH changes may lead to significant changes in the average pore size. As an example, for a silica-to-alumina molar ratio of 70:1, a gelation pH of 11.00 results in an average pore size of 14 nm, whereas a gelation pH of 10.67 results in an average pore size of 8 nm. It is also envisioned that the precipitation method may comprise mixing a basic aluminum source with an acid; adding a basic silicon source to said mixture so as to obtain a silica-alumina gel at a gelation pH so as to obtain an average pore size within a desirable range; and treating said gel so as to form the amorphous silica-alumina support.

The present inventors have found that in the absence of adjustment of the gelation pH in the formation of an amorphous silica-alumina support, the dispersion of metal deposited on the support to form a catalyst depends not only on the molar ratio of silica to alumina but also on the porous structure of the amorphous silica-alumina.

For amorphous silica-alumina materials formed with a given pH (wherein said selection is independent of the silica-to-alumina molar ratio), the porous structure of these amorphous silica-alumina materials varies with their corresponding silica-to-alumina ratios. As the preselected silica-to-alumina ratio increases for a given pH, the average pore size of the silica-alumina support also increases. However, it is quite desirable to select a suitable average pore size and to be able to obtain this suitable average pore size for the amorphous silica-alumina regardless of the preselected silica-to-alumina molar ratio. Therefore, to achieve the desirable porous structure for a preselected silica-to-alumina ratio, it is necessary to adjust the gelation pH during the formation of an amorphous silica-alumina. For illustration, for a preselected silica-to-alumina molar ratio, a decrease in the gelation pH should decrease the same average pore size of the amorphous silica-alumina material. Thus, the present inventors have found that the average pore size of a silica-alumina amorphous support can be controlled by adjusting the gelation pH during the formation of the silica-alumina gel.

The step (b) in the method includes selecting the gelation pH according to the desired average pore size of one silica-alumina gel with a given silica-to-alumina molar ratio. The pH adjustment to control average pore size is a modification of conventional precipitation preparation methods. For example, a method of preparing an amorphous silica-alumina is described in R. Snel, "Control of the Porous Structure of Amorphous Silica-Alumina I. The Effects of Sodium Ions and Syneresis," Applied Catalysis 11, pp. 271-280 (1984), hereby incorporated by reference to the extent that it discloses such methods. Suitable alternative conventional precipitation methods are contemplated as long as the same silica-to-alumina molar ratio is selected for both silica-alumina precursors and as long as one can modify the average pore size of each silica-alumina precursor without affecting the desired silica-to-alumina molar ratio.

The gel according to a preferred embodiment includes an amorphous silica-alumina gel with a preselected silica-to-alumina molar ratio. The silica-to-alumina molar ratio is preferably in the range of 3:1 to 1,000:1, more preferably between about 30:1 and about 500:1, still more preferably between about 40:1 and 400:1.

Treating in step (c) comprises aging the gel, preferably for between about 0.5 hour and about 72 hours, more preferably between about 0.5 hour and about 12 hours. The aging preferably occurs at room or ambient temperature.

When either or both of the silicon basic source and the aluminum basic source comprise sodium, treating the gel in step (c) preferably comprises contacting the aged gel mixture with an ion exchange solution and washing the ion-exchanged gel mixture with a wash liquid. The ion exchange solution has a sufficient concentration of alternate cations to substitute the sodium cations derived from the silicon and/or aluminum sources. The contacting may be performed for a sufficient amount of time so as to exchange substantially all of the sodium cations by the alternate cations present in the ion exchange solution. The ion exchange solution comprises preferably ammonium nitrate, ammonium carbonate, or combination thereof. The washing step should be effective to remove the majority of the spent ion exchange solution, which comprises the sodium cations. The wash liquid is preferably water.

Treating in step (c) further comprises drying the gel preferably for from about 1 to about 48 hours, more preferably from about 5 to about 24 hours. The drying preferably occurs at a temperature between about 80° C. and about 130° C. at a pressure between about 0 and about 10 atm, more preferably between about 1 atm and about 5 atm, still more preferably at about 1 atm. The drying preferably includes heating the gel mixture in an atmosphere of air. The drying preferably includes heating the hydrogel in an atmosphere of air.

Treating in step (c) further comprises calcining the gel for a period of time sufficient to transform silicate and aluminate species to silica and alumina, preferably between about 0.5 and about 24 hours, more preferably between about 1 and about 10 hours. The calcination preferably occurs at a temperature between about 230° C. and about 800° C., more preferably between about 400° C. and about 600° C., at a pressure between about 0 and about 10 atm, more preferably between about 1 atm and about 5 atm, still more preferably at about 1 atm. In embodiments, the calcination preferably includes heating the gel in an oxidizing atmosphere, such as air or other suitable oxygen-containing gas. The calcination preferably includes heating the hydrogel in an oxidizing atmosphere, such as air or other suitable oxygen-containing gas.

The use of ion-exchange steps and washing steps may be time-consuming and therefore may add costs to the method of preparation, so the silica-alumina gel may typically be quite expensive to make on a commercial scale. Reducing the size of the batch may significantly reduce the costs of preparation. Consequently, an alternate method for making the silica-alumina support comprises mixing two gels, wherein the first gel comprises a silica precursor and the second gel comprises a silica-alumina precursor with a silica-to-alumina ratio between about 1:1 and about 10:1; and treating the gel mixture so as to obtain an amorphous silica-alumina support, wherein the two gels are mixed in such proportion so as to obtain a silica-alumina support with a silica-to-alumina molar ratio between about 3:1 and about 1,000:1. The first gel can be prepared by dispersing a silicon source into a solvent and changing the pH so as to cause precipitation as to form a gel, and aging the gel. A non-limiting example is the precipitation of sodium silicate with sulfuric acid to produce a silica gel and sodium sulfate. Preferably, the first gel can be a suitable commercially available silica gel. The second gel can be prepared in the similar manner as described in the present invention by co-precipitation of basic silicon and aluminum sources, except that the aluminum content in the gel is much greater. Therefore, because silica gels are commercially available and the batch size for making the second silica-alumina gel is reduced, it is believed that this method may benefit from lower production costs as it uses smaller quantities of the silica-alumina gel and therefore may generate a more cost effective catalyst. In some embodiments, the support is homogenous with respect to silica and alumina.

Preferably, the amorphous silica alumina support is characterized by a BET surface area greater than about 260 $m^2/g$; preferably between about 260 $m^2/g$ and about 600 $m^2/g$, more preferably between about 300 $m^2/g$ and about 500 $m^2/g$; a pore volume between about 0.20 $cm^3/g$ and about 1.0 $cm^3/g$, and an average pore diameter between about 3 nm and about 30 nm, preferably between about 5 nm and about 20 nm.

The amorphous silica-alumina support is further characterized by a given acidity index. The acidity index is one way to quantify the number and strength of acidic sites found upon the surface of a catalyst support. The acidity index is described in Espinoza et al. in "Catalytic Oligimerization of Ethene over Nickel-Exchanged Amorphous Silica-Alumina: Effect of the Acid Strength of the Support", Applied Catalysis 29, pp. 295-303 (1987), which is incorporated herein by reference in its entirety. According to one embodiment of the present invention, the catalyst support is characterized by an acidity index between about 6 and about 129. The acidity index preferably is determined according to the procedure that R. L. Espinoza et al. described.

It is to be understood that the present invention is not limited to the novel method for the making of optimized silica-alumina supports and their use in Fischer-Tropsch synthesis, but instead can be applied to catalysts based on other composite supports for which it is desired to optimize catalytic performance and reactant/product diffusion. Other composite supports may comprise a mixture of two elements, wherein one of the two elements when mixed with the other element may form ion-exchange sites suitable for preferentially binding species of catalytic metal. Other composite supports may be inorganic mixed oxides, such as mixtures of silica, alumina, thoria, ceria, titania, boria, tungsten oxide, nickel oxide, or zirconia. The preferred combinations of inorganic oxides are silica-alumina, silica-titania, alumina-zirconia and titania-zirconia, more preferably silica-alumina or titania-zirconia.

Thus, the invention also generally relates to a method of making a catalyst comprising a catalytic metal and a composite support of a desirable pore size, wherein the composition of the composite support and not its average pore size controls the average crystallite size of the catalytic metal deposited on said composite support such that a catalyst with improved catalytic performance is made. The method preferably comprises forming a mixture containing precursors of a first element and of a second element in a manner effective to distribute species of said second element amongst species of said first element; treating said mixture so as to form a porous composite support with a desirable average pore size, wherein the porous composite support comprises a molar ratio of the first element to the second element between about 3:1 and about 1,000:1; applying a compound of a catalytic metal to said porous composite support to form a catalyst precursor; and treating said catalyst precursor so as to form a catalyst comprising catalytic metal crystallites of an average crystallite size, wherein the catalyst comprises a molar ratio of catalytic metal to second element between about 2:1 and about 1,000:1, wherein the average crystallite size is controlled by the molar ratio of catalytic metal to second element and is not limited by the average pore size of said porous composite support.

The deposition and growth of the catalytic metal crystallites is controlled by the molar ratio of catalytic metal to second element, and therefore the size of these crystallites does not have to be dependent on the porous structure. The average crystallite size can be selected for optimal catalytic reaction and not limited by the type of pores that the support provides. Consequently, the average crystallite size can be greater than the average pore size of the support.

The first element can comprise one or more elements from silicon, titanium, zirconium, thorium, cerium, aluminum, boron, oxides thereof, or any combination thereof. The second element differs from said first element and may comprise aluminum, zirconium, titanium, tungsten, molybdenum, sulfate, boron, gallium, scandium, oxides thereof, or combinations thereof. In some embodiments, the second element may comprise aluminum, tungsten, molybdenum, sulfate, boron, gallium, scandium, oxides thereof, or combinations thereof. In preferred embodiments, the first element comprises silicon or an oxide thereof and the second element comprises aluminum or an oxide thereof, or vise versa. In other embodiments, the precursor of the first element comprises sodium silicate and the precursor of the second element comprises sodium aluminate or vise versa. In alternate embodiments, the first element comprises titanium or an oxide thereof, and the second element zirconium or an oxide thereof, or vise versa.

Preferably, the covalently-bound complexes comprise most of the species of the second element form. These covalently-bound complexes may be in the form of $M_1$-O-$M_2$, wherein $M_1$ represents the first element; $M_2$ the second element; and O an oxygen atom. These covalently-bound complexes preferably have some ion-exchange capacity, which is useful for binding of catalytic metal species to these complexes. These covalently-bound complexes are preferably acidic; more preferably comprising $H_3O^+$ cations.

Preferably, species of said first element and said second element form acidic covalently-bound complexes. These acidic complexes serve as nucleation sites for the catalytic metal crystallites, and their concentration in the support is correlated to the relative molar ratio of the first element to the second element.

Forming a mixture comprises mixing a precursor of said first element and a precursor of said second element in a solvent so as to form a mixture thereof and adding an acid to said mixture so as to form a hydrogel, and aging the hydrogel. Treating may also comprise contacting with an ion-exchange solution and washing the gel. Treating preferably comprises drying and calcining so as to form said amorphous composite support. In some embodiments, the treating conditions include those noted above. In alternative embodiments, the hydrogel includes a lower acidity silica-alumina, which results in the amorphous support comprising low acidity silica-alumina (LASA).

Catalyst Composition

A catalyst according to a preferred embodiment of the present invention preferably includes a catalytic metal. The catalytic metal may be any of the elements commonly recognized as metals. At least a portion of the catalytic metal component is preferably reduced catalytic metal. Reduced catalytic metal herein denotes catalytic metal with an oxidation state of zero, also commonly termed the metallic state. Thus, the catalytic metal contained by a catalyst according to a preferred embodiment of the present invention is preferably in a reduced, metallic state before use of the catalyst in a catalytic reaction, such as the Fischer-Tropsch synthesis. However, it is to be understood that the catalytic metal may be present in the form of a metal compound, such as a metal oxide, a metal nitrate, a metal hydroxide, and the like.

The catalytic metal is preferably a metal that, in its active form, has catalytic activity for the Fischer-Tropsch reaction, hereinafter referred to as a Fischer-Tropsch metal. Fischer-Tropsch metals include Group 8 metals, such as iron (Fe), ruthenium (Ru), and osmium (Os), Group 9 metals, such as cobalt (Co), rhodium (Rh), and iridium (Ir), Group 10 elements, such as nickel (Ni), palladium (Pd), and platinum (Pt), and the metals molybdenum (Mo), rhenium (Re), and tungsten (W). The catalytic metal is preferably selected from cobalt, iron, ruthenium, nickel and combinations thereof. The catalytic metal is most preferably cobalt. The amount of catalytic metal present in the catalyst may vary widely. The catalyst preferably contains a catalytically effective amount of the catalytic metal.

It will be understood that, when the catalyst includes more than one supported metal, the catalytic metal, as termed herein, is the primary supported metal present in the catalyst. The primary supported metal is preferably determined by weight, that is, the primary supported metal is preferably present in the greatest % by weight.

When the catalytic metal is cobalt, the catalyst preferably has a nominal composition that includes cobalt in an amount totaling from about 1% to about 50% by weight (as the metal) of total catalyst composition (catalytic metal, support, and any optional promoters), more preferably from about 5% to about 40% by weight and still yet more preferably from about 15% to about 35% by weight. It will be understood that % indicates percent throughout the present specification.

When the catalytic metal is iron, the catalyst preferably has a nominal composition including from about 5 to about 75 wt. % iron, preferably from about 10 to about 60 wt. % iron, more preferably from about 20 to about 50 wt. % iron.

Alternatively, when the catalytic metal is ruthenium, the catalyst preferably has a nominal composition including from about 0.01 to about 5 wt. % ruthenium preferably from about 0.5 to about 4 wt. % ruthenium, more preferably from about 1 to about 3 wt. % ruthenium.

Optionally, the catalyst according to a preferred embodiment of the present invention may also include at least one promoter known to those skilled in the art. The promoter may vary according to the catalytic metal. A promoter may be an element that also, in an active form, has catalytic activity in the absence of the catalytic metal. Such an element will be termed herein a promoter when it is present in the catalyst in a lesser wt. % than the catalytic metal. In one embodiment, the promoter comprises between about 0.001 and about 10 wt. % of the total catalyst weight.

A promoter preferably enhances the performance of the catalyst. Suitable measures of the performance that may be enhanced include selectivity, reactant conversion, hydrocarbon productivity, product yield, activity, stability, reducibility, regenerability, and resistance to sulfur poisoning. A promoter is preferably a Fischer-Tropsch promoter, which is an element or compound that enhances the performance of a Fischer-Tropsch catalyst in a Fischer-Tropsch process.

It will be understood that, as contemplated herein, an enhanced performance of a promoted catalyst may be calculated according to any suitable method known to one of ordinary skill in the art. In particular, an enhanced performance may be given as a percent and computed as the ratio of the performance difference to the performance of a reference catalyst. The performance difference is between the performance of the promoted catalyst and the reference catalyst, wherein the reference catalyst is a similar corresponding catalyst having the nominally same amounts, e.g. by weight percent, of all components except the promoter. It will further be understood that as contemplated herein, a performance may be measured in any suitable units. For example, when the performance is the productivity, the productivity may be measured in grams product per hour per liter reactor volume, grams product per hour per kg catalyst, and the like.

Suitable promoters vary with the catalytic metal and may be selected from Groups 1-15 of the Periodic Table of the Elements. The promoter may be present in the catalyst in an amount between about 0.00001 and about 10% rhenium by weight of the total catalyst composition. A promoter is preferably present in an amount to provide a weight ratio of elemental promoter: elemental catalytic metal of from about 0.00005:1 to about 0.5:1, preferably from about 0.0005:1 to about 0.25:1 (dry basis). A promoter may be in elemental form. When the promoter comprises a metal from Groups 7, 8, 9, and 10 of the Periodic Table, such as rhenium, ruthenium, platinum, or palladium, the weight ratio of elemental promoter: elemental catalytic metal is preferably between about 0.00005:1 and about 0.05:1. Alternatively, a promoter may be present in an oxide compound. Further, a promoter may be present in an alloy containing the catalytic metal.

When the catalytic metal is cobalt, suitable promoters include Group 1 elements such as potassium (K), lithium (Li), sodium (Na), and cesium (Cs); Group 2 elements such as calcium (Ca), magnesium (Mg), strontium (Sr), and barium (Ba); Group 3 elements such as scandium (Sc), yttrium (Y), and lanthanum (La); Group 4 elements such as titanium (Ti), zirconium (Zr), and haffium (Hf); Group 5 elements such as vanadium (V), niobium (Nb), and tantalum (Ta); Group 6 elements such as molybdenum (Mo) and tungsten (W); Group 7 elements such as rhenium (Re) and manganese (Mn); Group 8 elements such as ruthenium (Ru) and osmium (Os); Group 9 elements such as rhodium (Rh) and iridium (Ir); Group 10 elements such as platinum (Pt) and palladium (Pd); Group 11 elements such as silver (Ag) and copper (Cu); Group 12 elements, such as zinc (Zn), cadmium (Cd), and mercury (Hg); Group 13 elements, such as gallium (Ga), indium (In), thallium (Tl), and boron (B); Group 14 elements such as tin (Sn) and lead (Pb); and Group 15 elements such as phosphorus (P), bismuth (Bi), and antimony (Sb). When the catalytic metal is cobalt, the promoter is preferably selected from among rhenium, ruthenium, platinum, palladium, boron, silver, and combinations thereof. In other embodiments, the promoter can be selected from among rhenium, ruthenium, platinum, palladium, boron, sliver, and combination of two or more therof.

When the cobalt catalyst includes rhenium, the rhenium is preferably present in the catalyst in an amount between about 0.001 and about 5% rhenium by weight of the total catalyst composition, more preferably between about 0.01 and about 2 wt. % rhenium, still more preferably between about 0.2 and about 1 wt. % rhenium.

When the cobalt catalyst includes ruthenium, the ruthenium is preferably present in the catalyst in an amount between about 0.0001 and about 5% ruthenium by weight of the total catalyst composition, more preferably between about 0.001 and about 1 wt. % ruthenium, and still more preferably between about 0.01 and about 1 wt. % ruthenium.

When the cobalt catalyst includes platinum, the platinum is preferably present in the catalyst in an amount between about 0.00001 and about 5% by weight of the total catalyst composition, more preferably between about 0.0001 and about 1 wt. % platinum, still more preferably between about 0.0005 and 1 wt. % platinum; yet still more preferably between about 0.005 and 0.5 wt. % platinum; most preferably between about 0.005 and 0.05 wt. % platinum.

When the cobalt catalyst includes palladium, the palladium is preferably present in the catalyst in an amount between about 0.00001 and about 5% palladium by weight of the total catalyst composition, more preferably between about 0.0001 and about 2 wt. % palladium, and still more preferably between about 0.0005 and about 1 wt. % palladium.

When the cobalt catalyst includes silver, the catalyst preferably has a nominal composition including from about 0.05 to about 10% silver by weight of the total catalyst composition, more preferably from about 0.07 to about 7 wt. % silver, and still more preferably from about 0.1 to about 5 wt. % silver.

When the cobalt catalyst includes boron, the catalyst preferably has a nominal composition including from about 0.025 to about 2% boron by weight of the total catalyst composition, more preferably from about 0.05 to about 1.8 wt. % boron, and still more preferably from about 0.075 to about 1.5 wt. % boron.

By way of example and not limitation, when the catalytic metal is iron, suitable promoters include copper (Cu), potassium (K), silicon (Si), zirconium (Zr), silver (Ag), lithium (Li), sodium (Na), rubidium (Rb), cesium (Cs), magnesium (Mg), calcium (Ca), strontium (Sr), barium (Ba), and combinations thereof. When the catalytic metal is iron, the promoter more preferably comprises potassium, copper, lithium, sodium, silver, magnesium, and combinations thereof. When the catalytic metal is iron, the catalyst may include potassium or lithium as a promoter; and alternatively or in combination, the catalyst may include copper or silver.

When the iron catalyst comprises lithium as a promoter, lithium is present in an amount preferably between about 0.05% and about 5% lithium by weight of the total catalyst composition; and more preferably, between about 0.5 wt. % and about 2 wt. % lithium.

When the iron catalyst comprises silver as a promoter, silver is present in an amount preferably between about 0.001% and about 5% silver by weight of the total catalyst composition; more preferably between about 0.001 wt. % and about 2 wt. % silver; and still more preferably between about 0.005 wt. % and 1 wt. % silver.

When the iron catalyst comprises potassium as a promoter, potassium is present in an amount preferably between about 0.0001 wt. % and about 10 wt. % potassium to total weight of catalyst; more preferably, between about 0.0005 wt. % and about 1 wt. % potassium; and still more preferably, between about 0.0005 wt. % and about 0.5 wt. % potassium.

When the iron catalyst comprises calcium as a promoter, calcium is present in an amount preferably between about 0.001% and about 4% calcium by weight of the total catalyst composition; more preferably, between about 0.5 wt. % and about 3 wt. % calcium.

When the iron catalyst comprises copper as a promoter, copper is preferably present in an amount to provide a nominal catalyst composition including between about 0.1.% and about 10% copper by weight of the total catalyst composition.

Alternatively, by way of example and not limitation, when the catalytic metal is ruthenium, suitable promoters include rhenium. When the ruthenium catalyst includes rhenium, the rhenium is preferably present in the catalyst in an amount between about 0.001 and about 1% rhenium by weight of the total catalyst composition, more preferably between about 0.01 and about 0.5 wt. % rhenium, still more preferably between about 0.05 and about 0.5 wt. % rhenium.

As used herein, a nominal composition is a composition specified with respect to an active catalyst. The active catalyst may be either fresh or regenerated. The active catalyst preferably has been subjected to a treatment effective to essentially render the catalytic metal to reduced catalytic metal. For example, a conventional catalyst may be heated under flowing hydrogen to a temperature from about 300° C. to about 500° C. for from about 2 to about 36 hours to provide active catalyst. The nominal composition may be determined by experimental elemental analysis of an active catalyst. Alternatively, the nominal composition may be determined by numerical analysis from the known amounts of catalytic metal, promoter, and support used to make the catalyst. It will be understood that the nominal composition as determined by these two methods will typically agree within conventional accuracy.

The invention further relates to a catalyst comprising a porous composite support comprising a first element and a second element with a molar ratio of the first element to the second element between about 3:1 and about 1,000:1; and a catalytic metal comprising catalytic metal crystallites deposited on said support, wherein the support is made in a manner effective in distributing species of said second element amongst species of said first element, wherein the catalyst has a molar ratio of catalytic metal to said second element between about 2:1 and about 1,000:1; and wherein species of said second metal serve as nucleation centers for said catalytic metal crystallites. The first element may comprise silicon, titanium, zirconium, thorium, cerium, aluminum, boron, or oxides thereof. The second element may comprise aluminum, tungsten, molybdenum, sulfate, boron, gallium, scandium, oxides thereof, or combinations thereof. The catalytic metal preferably comprises an element from Groups 6-11 of the Periodic Table (new IUPAC notation); more preferably cobalt, nickel, iron, and ruthenium. Preferably species of said first element and said second element form covalently-bound complexes with some ion-exchange capacity.

A particular embodiment comprises a cobalt Fischer-Tropsch catalyst, wherein the average cobalt crystallite size is greater than the average pore size. The Fischer-Tropsch cobalt-based catalyst includes an amorphous silica-alumina support and cobalt crystallites with an average crystallite size deposited on said support, wherein the average cobalt crystallite size is greater than the average pore size. The catalyst has a molar ratio of cobalt to alumina between about 2:1 and about 1,000:1. The support has a molar ratio of silica to alumina between about 3:1 and about 1,000:1; an average pore size between about 5 nm and about 20 nm; and a surface area greater than about 260 m$^2$/g. The average cobalt crystallite size is preferably between about 6 nm and about 25 nm. The average cobalt crystallite size is at least 10% greater than the average pore size. In alternative embodiments, the average pore size is between about 5 nm and about 40 nm.

Methods of Making the Catalyst

The present catalysts may be prepared by suitable method known to those skilled in the art. By way of illustration and not limitation, methods of preparing a supported catalyst include impregnating a catalyst material onto the support, extruding the supported material together with catalyst material to prepare catalyst extrudates, and/or precipitating the catalyst material onto a support. Accordingly, the supported catalysts of the present invention may be used in the form of powders, particles, pellets, monoliths, honeycombs, packed beds, foams, and aerogels. The catalyst material may include any one or combination of a catalytic metal, a precursor compound of a catalytic metal, a promoter, and a precursor compound of a promoter.

The most preferred method of preparation may vary among those skilled in the art depending, for example, on the desired catalyst particle size. Those skilled in the art are able to select the most suitable method for a given set of requirements.

One method of preparing a catalyst by impregnating a catalyst material onto a support includes impregnating the support with a solution containing the catalyst material. Suitable solvents include water and organic solvents (e.g., toluene, methanol, ethanol, and the like). Those skilled in the art will be able to select the most suitable solvent for a given catalyst material. The catalyst material may be in the form of a salt of a catalytic metal or promoter element. Thus, one method of preparing a supported metal catalyst is by incipient wetness impregnation of the support with a solution of a soluble metal salt. Incipient wetness impregnation preferably proceeds by solution of a cobalt compound in a minimal amount of solvent sufficient to fill the pores of the support. Alternatively, the catalyst material may be in the form of a zero-valent compound of a catalytic metal or promoter element. Thus, another preferred method is to impregnate the support with a solution of zero valent metal such as cobalt carbonyl (e.g. $Co_2(CO)_8$, $Co_4(CO)_{12}$) or the like.

Another method of impregnation comprises impregnating a support with a molten salt of a catalytic metal or promoter. One preferred method comprises impregnating the support with a molten metal nitrate (e.g., $Co(NO_3)_2.6H_2O$). A promoter compound may be impregnated in a separate step, independent of impregnation with the catalytic metal compound. Alternatively, a promoter compound may be impregnated simultaneously with the catalytic metal compound. For example, the promoter and catalytic metal compound may be impregnated from a common solution.

When a catalyst material is impregnated as a precursor of the material, e.g. a salt or zero valent compound, those skilled in the art will be able to select the most suitable precursor.

Suitable cobalt-containing precursor compounds include, for example, cobalt nitrate, cobalt carbonyl, cobalt acetate, cobalt acetyl acetonate, cobalt oxalate, and the like. Cobalt nitrate, cobalt carbonyl and cobalt nitrate hexahydrate are exemplary water-soluble, cobalt-containing precursor compounds. Cobalt oxalate is soluble in acids or acidic solutions. Cobalt acetate and cobalt acetyl acetonate are exemplary of cobalt-containing precursor compounds soluble in organic solvents, such as acetone and methanol.

Suitable water-soluble, rhenium-containing precursor compounds are preferred and include, for example, perrhenic acid, ammonium perrhenate, rhenium pentacarbonyl chloride, rhenium carbonyl, and the like.

Suitable ruthenium-containing precursor compounds soluble in water include for example ruthenium carbonyl, $Ru(NH_3)_6.Cl_3$, Ru(III)2,4-pentanedionate, ruthenium nitrosyl nitrate, and the like. Water-soluble ruthenium-containing precursor compounds are preferred.

Suitable platinum-containing precursor compounds soluble in water include, for example, $Pt(NH_3)_4(NO_3)_2$ and the like. Alternatively, the platinum-containing precursor may be soluble in an organic solvent, such as platinum acetyl acetonate soluble in acetone.

Suitable boron-containing precursor compounds soluble in water include, for example, boric acid, and the like. Alternatively, the boron-containing precursor may be soluble in an organic solvent.

Suitable silver-containing precursor compounds soluble in water include, for example, silver nitrate ($AgNO_3$) and the like. Alternatively, the silver-containing precursor silver acetate may be soluble in an organic solvent.

Suitable palladium-containing precursor compounds include palladium nitrate ($Pd(NO_3)_2$) and the like. Suitable palladium-containing precursor compounds soluble in an organic solvent include palladium oxide (PdO), which is soluble in acetone, and the like.

The impregnated support is preferably treated to form a treated impregnated support. The treatment may include drying the impregnated support. Drying the impregnated support preferably occurs at a temperature between about 80 and about 150° C. Typically, drying proceeds for from about 0.5 to about 24 hours at a pressure of between about 0 and about 10 atm, more preferably between about 1 and about 5 atm, still more preferably at about 1 atm.

Alternatively, or in combination, treating an impregnated support to form a treated impregnated support may include calcining the impregnated support. The calcination preferably achieves oxidation of any impregnated compound or salt of a supported material to an oxide compound of the supported material. When the catalytic metal includes cobalt, the calcination preferably proceeds at a temperature between about 200° C. and about 800° C., more preferably between about 275° C. and about 425° C., still more preferably between about 300° C. and about 425° C. Typically, calcining proceeds for an interval of time ranging from about 0.5 to about 24 hours and at a pressure between about 0 and about 10 atm, more preferably between about 1 and about 5 atm, still more preferably at about 1 atm.

The impregnation of a catalytic metal and an optional promoter on a support may proceed by multi-step impregnation, such as by two, three, or four impregnation steps. Each impregnation step may include impregnation of any one or combination of catalytic metal and promoter. Each impregnation step may be followed by any of the above-described treatments of the impregnated support. In particular, each step of impregnating the support to form an impregnated support may be followed by treating the impregnated support to form a treated impregnated support. Thus, a multi-step impregnation may include multiple steps of drying and/or calcination. Each subsequent step of drying may proceed at a different temperature from any earlier steps of drying. Further, each subsequent step of calcination may proceed at a different temperature from any earlier steps of calcination. By way of example and not limitation, a multi-step impregnation may include calcining the support at a first temperature that is higher than the temperature for subsequent calcinations.

The catalytic metal contained by a catalyst according to a preferred embodiment of the present invention is preferably in a reduced, metallic state before use of the catalyst in the Fischer-Tropsch synthesis. However, it will be understood that the catalytic metal may be present in the form of a metal compound such as a metal oxide, a metal hydroxide, and the like. The catalytic metal is preferably uniformly dispersed throughout the support. It is also understood that the catalytic metal can also be present at the surface of the support, in particular on the surface or within a surface region of the support, or that the catalytic metal can be non-homogeneously dispersed onto the support. It should be noted that the support according to this invention comprises alumina sites, which are specifically introduced into the support matrix. Without being limited by theory, since it is therefore believed that these alumina sites guide the deposition of catalytic metal species, then the distribution of the alumina sites (particularly the alumina weak and/or strong acid sites) within the silica-alumina support matrix may dictate the homogeneity/heterogeneity of the dispersion of the catalytic metal. Therefore, if a homogeneous catalytic metal dispersion is desirable, a precipitation technique for making the support may be used.

The catalyst may have a molar ratio of catalytic metal to alumina between about 2:1 and about 1,000:1, preferably between about 2:1 and about 600:1, more preferably between about 5:1 and about 300:1, still more preferably between 10:1 and 150:1. When cobalt is the catalytic metal, the cobalt catalyst preferably has a molar ratio of cobalt to alumina between about 5:1 and about 150:1. When iron is the catalytic metal, the iron catalyst preferably has a molar ratio of iron to alumina between about 5:1 and about 300:1. When ruthenium is the catalytic metal, the ruthenium catalyst preferably has a molar ratio of ruthenium to alumina between about 2:1 and about 100:1.

The final treated catalyst may be activated to form an active catalyst by heating in a reducing gas. The activation preferably achieves reduction of any oxide of the catalytic metal to a reduced state. As described above, typically, at least a portion of the metal(s) of the catalytic metal component of the catalysts of the present invention is present in a reduced state (i.e., in the metallic state). The reduction step may not be necessary if the catalyst is prepared with zero valent catalytic metal. When the hydrogen reduction step is not necessary, the treatment of the impregnated support forms the active catalyst.

Typically, activating the catalyst precursor to form an active catalyst includes treating the catalyst precursor with hydrogen at a temperature in the range of from about 75° C. to about 500° C., for about 0.5 to about 48 hours at a pressure of about 1 to about 75 atm. Pure hydrogen may be used in the reduction treatment, as may a mixture of hydrogen and an inert gas such as nitrogen or a mixture of hydrogen and other gases as are known in the art such as carbon monoxide and carbon dioxide. Reduction with pure hydrogen and reduction with a mixture of hydrogen and carbon monoxide are preferred. The amount of hydrogen may range from about 1% to about 100% by volume.

Fischer-Tropsch Operation

According to yet another embodiment of the present invention, a process for producing hydrocarbons includes contacting a feed stream that includes carbon monoxide and hydrogen with a catalyst, wherein the catalyst is a catalyst having a composition according to any of the above-described embodiments. According to still yet another embodiment of the present invention, a process for producing hydrocarbons includes contacting a feed stream that includes carbon monoxide and hydrogen with a catalyst in a reaction zone so as to produce hydrocarbons, wherein the catalyst is a catalyst made according to any of the above-described embodiments.

The feed gases charged to the process of the invention comprise hydrogen, or a hydrogen source, and carbon monoxide. $H_2$/CO mixtures suitable as a feedstock for conversion to hydrocarbons according to the process of this invention can be obtained from any source known to those skilled in the art, including, for example, from conversion of natural gas or light hydrocarbons of five carbons atoms or less by steam reforming, dry ($CO_2$) reforming, auto-thermal reforming, advanced gas heated reforming, partial oxidation, catalytic partial oxidation, or other processes known in the art, or from coal by gasification; or from biomass. In addition, the feed gases can comprise off-gas recycle from the present or another Fischer-Tropsch process. Preferably, the hydrogen is provided by free hydrogen, although some Fischer-Tropsch catalysts have sufficient water gas shift activity to convert some water to hydrogen for use in the Fischer-Tropsch process. It is preferred that the molar ratio of hydrogen to carbon monoxide in the feed be greater than 0.5:1 (e.g., from about 0.67 to about 2.5). Preferably, when cobalt, nickel, and/or ruthenium catalysts are used, the feed gas stream contains hydrogen and carbon monoxide in a molar ratio of about 1.6:1 to about 2.3:1. Preferably, when iron catalysts are used, the feed gas stream contains hydrogen and carbon monoxide in a molar ratio between about 1.4:1 and about 2.2:1. The feed gas may also contain carbon dioxide. The feed gas stream preferably contains only a low concentration of compounds or elements that have a deleterious effect on the catalyst, such as poisons. For example, the feed gas may need to be pretreated to ensure that it contains low concentrations of sulfur or nitrogen compounds such as hydrogen sulfide, hydrogen cyanide, ammonia and carbonyl sulfides.

The feed gas is contacted with the catalyst in a reaction zone. Mechanical arrangements of conventional design may be employed as the reaction zone including, for example, plugged flow, continuous stirred tank, fixed bed, fluidized bed, slurry phase, slurry bubble column, reactive distillation column, or ebulliating bed reactors, among others, may be used. Examples of suitable slurry bubble column reactors are described in co-owned, published U.S. Patent Applications 2003-0027875 and 2003-0114543, each being incorporated herein by reference in their entirety. Plug flow, fluidized bed, reactive distillation, ebulliating bed, and continuous stirred tank reactors have been delineated in "Chemical Reaction Engineering," by Octave Levenspiel, and are known in the art. The size and physical form of the catalyst may vary depending on the reactor in which it is to be used.

When the reaction zone includes a slurry bubble column, the column preferably includes a three-phase slurry. Further, a process for producing hydrocarbons by contacting a feed stream including carbon monoxide and hydrogen with a catalyst in a slurry bubble column preferably includes dispersing the particles of the catalyst in a liquid phase comprising the hydrocarbons to form a two-phase slurry; and dispersing the hydrogen and carbon monoxide in the two-phase slurry to form the three-phase slurry. Further, the slurry bubble column preferably includes a vertical reactor and dispersal preferably includes injection and distribution in the bottom half of the reactor. Alternatively, dispersal may occur in any suitable alternative manner, such as by injection and distribution in the top half of the reactor.

The Fischer-Tropsch process is typically run in a continuous mode. In this mode, the gas hourly space velocity through the reaction zone typically may range from about 50 to about 10,000 $hr^{-1}$, preferably from about 300 $hr^{-1}$ to about 2,000 $hr^{-1}$. The gas hourly space velocity is defined as the volume of reactants per time per reaction zone volume. The volume of reactant gases is at standard conditions of pressure (101 kPa) and temperature (0° C.). The reaction zone volume is defined by the portion of the reaction vessel volume where the reaction takes place and which is occupied by a gaseous phase comprising reactants, products and/or inerts; a liquid phase comprising liquid/wax products and/or other liquids; and a solid phase comprising catalyst. The reaction zone temperature is typically in the range of from about 160° C. to about 300° C. Preferably, the reaction zone is operated at conversion promoting conditions at temperatures from about 190° C. to about 260° C.; more preferably from about 205° C. to about 230° C. The reaction zone pressure is typically in the range of from about 80 psia (552 kPa) to about 1,000 psia (6,895 kPa), more preferably from about 80 psia (552 kPa) to about 800 psia (5,515 kPa), and still more preferably from about 140 psia (965 kPa) to about 750 psia (5,170 kPa). Most preferably, the reaction zone pressure is from about 250 psia (1,720 kPa) to about 650 psia (4,480 kPa).

The products resulting from Fischer-Tropsch synthesis have a range of molecular weights. Typically, the carbon number range of the product hydrocarbons start at methane and continue to about 80 carbons per molecule or more. The catalyst of the present process is particularly useful for making hydrocarbons having five or more carbon atoms, especially when the above-referenced preferred space velocity, temperature and pressure ranges are employed.

The effluent stream of the reaction zone may be cooled to affect the condensation of hydrocarbons, for example those liquid under standard conditions of ambient temperature and pressure and passed into a separation zone separating the vapor phase products from effluent stream. The vapor phase material may be passed into a second stage of cooling for recovery of additional hydrocarbons. The remaining effluent stream together with any liquid from a subsequent separation zone may be fed into a fractionation column. Typically, a stripping column is employed first to remove light hydrocarbons such as propane and butane. Further, the effluent stream is treated to remove alcohols and hydrogenate the olefins. The remaining hydrocarbons may be passed into a fractionation column which they are separated by boiling point range into products such as naphtha, kerosene and fuel oils. Hydrocarbons recovered from the reaction zone and having a boiling point above that of the desired products may be passed into conventional processing equipment such as a hydrocracking zone in order to reduce their molecular weight. The gas phase recovered from the reactor zone effluent stream after hydrocarbon recovery may be partially recycled if it contains a sufficient quantity of hydrogen and/or carbon monoxide.

Without further elaboration, it is believed that one skilled in the art can, using the description herein, utilize the present invention to its fullest extent. The following embodiments are to be construed as illustrative and not as constraining the scope of the present invention in any way whatsoever.

EXAMPLES

The invention having been generally described, the following EXAMPLES are given as particular embodiments of the invention and to demonstrate the practice and advantages hereof. It is understood that the examples are given by way of illustration and are not intended to limit the specification or the claims to follow in any manner.

Examples 1-9

These examples 1-9 illustrate that physical properties of a silica-alumina support can be controlled by controlling the preparation of the support so as to select the gelation pH in relationship to the silica-alumina ratio. Specifically, Examples 4-8 illustrate that the method of making catalyst supports according to this invention results in making different silica-alumina materials with varied silica to alumina ratios and yet with the same average pore size. Preparation of the supports is described in Examples 1-8. Characterization of the BET surface area, average pore size, and pore volume of the supports is described in Example 9.

Example 1

Sodium aluminate and sodium silicate were co-precipitated with the addition of diluted nitric acid. The amounts of sodium aluminate and sodium silicate were selected so as to produce a ratio of moles silica to moles alumina of 30. A hydrogel was obtained within 30 minutes, and the gelation pH was 11.0. The gel was then aged for three days at room temperature. Thereafter, ion exchange was performed with a 1.0 molar ammonium nitrate solution to convert it from the $Na^+$ to $H^+$-form. Next, the hydrogel was washed with water to remove most of the ammonium nitrate. Finally, the gel was dried at 110° C. overnight and calcined in air at 550° C. for three hours. The resulting sample was then crushed and sieved before use.

Example 2

The procedure of Example 1 was used except that the amounts of sodium aluminate and sodium silicate were selected so as to produce a ratio of moles silica to moles alumina of 70.

Example 3

The procedure of Example 1 was used except that the amounts of sodium aluminate and sodium silicate were selected so as to produce a ratio of moles silica to moles alumina of 1,000.

Example 4

The procedure of Example 1 was used except that the amounts of sodium aluminate and sodium silicate were selected so as to produce a ratio of moles silica to moles alumina of 400, and the gelation pH needed to obtain an average pore diameter of 8 nm for this specific silica to alumina molar ratio was 10.40.

Example 5

The procedure of Example 1 was used except that the amounts of sodium aluminate and sodium silicate were selected so as to produce a ratio of moles silica to moles alumina of 300, and the gelation pH needed to obtain an average pore diameter of 8 nm for this specific silica to alumina molar ratio was 10.44.

Example 6

The procedure of Example 1 was used except that the amounts of sodium aluminate and sodium silicate were selected so as to produce a ratio of moles silica to moles alumina of 200, and the gelation pH needed to obtain an average pore diameter of 8 nm for this specific silica to alumina molar ratio was 10.44.

Example 7

The procedure of Example 1 was used except that the amounts of sodium aluminate and sodium silicate were selected so as to produce a ratio of moles silica to moles alumina of 70, and the gelation pH needed to obtain an average pore diameter of 8 nm for this specific silica to alumina molar ratio was 10.67.

Example 8

The procedure of Example 1 was used except that the amounts of sodium aluminate and sodium silicate were selected so as to produce a ratio of moles silica to moles alumina of 40, and the gelation pH needed to obtain an average pore diameter of 8 nm for this specific silica to alumina molar ratio was 10.73.

Example 9

Support Characterization

The BET surface area, pore volume, and average pore diameter of the supports of Examples 1-8 were measured by conventional techniques. It can be seen from the results for Examples 1-3 that, for constant gelation pH, the ratio of silica to alumina has a strong effect on the BET surface area, pore volume, and average pore diameter of the supports. In order to prove that the silica to alumina ratio of the support has an effect of the dispersion, all the different supports must have basically the same average pore size. Therefore, the gelation pH of Examples 4 to 8 were varied, according to the silica to alumina ratio of each specific support to obtain a constant average pore size diameter of about 8 nm.

Further, it can be seen from the results for Examples 4-8 that the BET surface area, pore volume, and average pore diameter can be maintained approximately constant by decreasing the gelation pH with increasing silica-alumina ratio. Examples 2 and 7 also illustrate that, for a given silica-to-alumina molar ratio, a lower gelation pH results in a smaller average pore diameter.

TABLE 1

| Ex. | $SiO_2$—$Al_2O_3$ Molar Ratio | Gelation pH | BET Surface area, $m^2/g$ | Pore volume, cc/g | Avg. Pore Diameter, nm |
|---|---|---|---|---|---|
| 1 | 30 | 11.0 | 338 | 0.94 | 9.5 |
| 2 | 70 | 11.0 | 290 | 1.11 | 14.0 |
| 3 | 1000 | 11.0 | 275 | 1.35 | 19.6 |
| 4 | 400 | 10.40 | 380 | 0.90 | 8.0 |
| 5 | 300 | 10.44 | 389 | 0.90 | 8.0 |
| 6 | 200 | 10.44 | 394 | 0.90 | 8.0 |
| 7 | 70 | 10.67 | 384 | 0.90 | 8.0 |
| 8 | 40 | 10.73 | 386 | 0.90 | 8.0 |

Examples 10-14

Catalyst Preparation

Examples 10 to 14 illustrate that the metal or oxide dispersion can be controlled by varying the silica to alumina ratio of the support. The supports chosen for this test are those described in Examples 4 to 8, which have basically the same average pore size, surface area and pore volume as shown in Table 1.

Example 10

A catalyst was prepared by adding sufficient amounts of cobalt nitrate hexahydrate and platinum acetyl acetonate to the support of Example 4 so as to achieve a catalyst with the composition of 20 wt % Co/0.014 wt. % Pt. Cobalt nitrate (17.3 g of $Co(NO_3)_2.6H_2O$) was dissolved in deionized water (about 15 mL) and platinum acetyl acetonate (0.0051 g of Pt(II) acetyl acetonate) was dissolved in acetone (about 25 mL). Both cobalt and platinum solutions were added to a sample (28 g) of the support of Example 4 in a mixing flask. The material was then placed in an oven so as to dry the material at 90° C. for 12 hours. The material was then calcined in a fluidized bed unit. The air was fed through the fluidized bed at 700 standard cubic centimeters per minute (sccm). The temperature was ramped from ambient to 120° C. at 2° C./min and held at 120° C. for 1 hour. The temperature was then ramped from 120° C. to 300° C. at 2° C./min and held at 300° C. for 5 hours. The resulting first catalyst intermediate was allowed to cool to room temperature. The above procedure was repeated except that the catalyst support was replaced by the first catalyst intermediate.

Example 11

The procedure of Example 10 was used except that the support of Example 5 was used.

Example 12

The procedure of Example 10 was used except that the support of Example 6 was used.

Example 13

The procedure of Example 10 was used except that the support of Example 7 was used.

Example 14

The procedure of Example 10 was used except that the support of Example 8 was used.

Example 15

Catalyst Characterization

Metal surface area and dispersion were measured by hydrogen chemisorption, and the average crystallite size for cobalt was calculated from these values. The average crystallite size for cobalt, metal (cobalt) dispersion, metal surface area in $m^2/g$, the silica-to-alumina molar ratio and the cobalt-to-alumina molar ratio for Examples 10-14 are shown in Table 2.

As the silica-to-alumina molar ratio and the cobalt-to-alumina molar ratio increased in the catalyst of Examples 10-14, the metal dispersion and metal surface area for cobalt on the silica-alumina supports decreased, whereas the average cobalt crystallite size increased.

TABLE 2

| Ex. | $SiO_2$:$Al_2O_3$ molar ratio | Support Avg. Pore size, nm | Cobalt: Alumina molar ratio | Avg. Crystallite size, nm | Metal Dispersion % | Metal Surface Area, $m^2/g$ |
|---|---|---|---|---|---|---|
| 10 | 400 | 8.0 | 102 | 18.8 | 6.52 | 8.41 |
| 11 | 300 | 8.0 | 77 | 17.6 | 7.00 | 9.48 |
| 12 | 200 | 8.0 | 51 | 16.0 | 7.55 | 10.2 |
| 13 | 70 | 8.0 | 18 | 10.9 | 11.26 | 15.2 |
| 14 | 40 | 8.0 | 11 | 8.2 | 15.05 | 20.4 |

Graphing the metal dispersion on the y axis versus the silica-to-alumina molar ratio ($SiO_2$:$Al_2O_3$) on the x axis provided in Table 2 provides the plot shown in FIG. 1. A logarithimic regression analysis (shown below wherein the R value is 0.9494, SAR is the silica-alumina molar ratio, and d is the metal dispersion) revealed a good correlation (Equation 1) between the $SiO_2$:$Al_2O_3$ molar ratio and the metal dispersion percent in the catalysts of EXAMPLES 10-14.

$$d = 27.473 - 3.6094\, ln(SAR) \qquad (1)$$

In order to better understand the effect of the silica to alumina ratio, we modeled the surface of the support. We assumed that the acidic alumina sites were 100% effective in behaving as chemical "anchors" during the impregnation step and that no crystallites are formed without their participation. This simplification of the mechanism facilitated accurate modeling of the surface. According to the derived relation, a catalyst prepared using a support with a silica to alumina molar ratio of 40:1 will have 10 times more crystallites than a catalyst prepared using a support with a silica to alumina molar ratio of 400:1, assuming all other parameters remain constant.

Assuming that the crystallites are spherical (whole spheres or half spheres), the crystallite geometry for both catalysts (40:1 and 400:1 silica to alumina ratio) will be:

$$V = 4/3\pi R^3$$

Thus, a catalyst having a $SiO_2:Al_2O_3$ equal to 400:1 will contain the same number of cobalt atoms in one spherical crystallite of radius R as can be found in 10 spherical crystallites of radius 1 ($R_1$) in a catalyst having a $SiO_2:Al_2O_3$ equal to 40:1.

Generalizing, one crystallite of radius $R_1$ will have the same number of cobalt atoms as N crystallites of $R_2$ where:

$$N = SAR_2/SAR_1$$

where $SAR_1$ represents the silica to alumina molar ratio of the catalyst having crystallites of radius $R_1$ and $SAR_2$ represents the silica to alumina molar ratio of the catalyst having N crystallites of radius $R_2$.

Generalizing, the total volume occupied by a metal crystallite of radius $R_1$ is equivalent to the total volume occupied by N metal crystallites of radius $R_2$ and the following equation therefore applies:

$$4/3\pi R_1^3 = N 4/3\pi R_2^3$$

Solving for N yields the following simplified relation:

$$N = (R_1/R_2)^3 \text{ or } R_1/R_2 = N^{1/3}$$

Metal dispersion is the ratio of total available metal surface area to the theoretical available metal surface area expressed as a percentage. As the size of crystallites of a catalytic metal dispersed on a support surface decreases, the aggregated surface area for those crystallites increases. Therefore, the measured dispersion can be directly correlated to the external surface area of the crystallites. Therefore, one obtains the following correlations:

$$A_{R1} = 4\text{Pi } R_1^2$$

$$A_{R2} = 4\text{Pi } R_2^2$$

wherein $A_{R1}$ is the total surface area of a crystallite of radius $R_1$ and $A_{R2}$ is the total surface area of a crystallite of radius $R_2$.

The relationship between the metal dispersion ($Disp^{R2}$) corresponding to the surface area of N crystallites of radius $R_2$ and the metal dispersion ($Disp^{R1}$) corresponding to the surface area of a crystallite of radius $R_1$ is as shown below:

$$Disp^{R2}/Disp^{R1} = N A_{R2}/A_{R1} = N(R_2/R_1)^2 = (R_1/R_2)^3 (R_2/R_1)^2 = R_1/R_2 = N^{1/3}$$

Therefore, the total metal dispersion of N spheres (of radius of $R_2$) is predicted to be a factor of $N^{1/3}$ larger than the dispersion of one sphere of radius $R_1$.

According to this relation between N, $R_1$ and $R_2$, if we want for example to predict the dispersion of the catalyst prepared using a support with a silica alumina of 400:1 ($SAR_2$) based on the measured dispersion of a catalyst prepared using a support with a silica to alumina ratio of 300:1 ($SAR_1$), the calculation is as follows:

$$Disp^{R2} = Disp^{R1} * (SAR_2/SAR_1)^{1/3}$$

For example, for a measured dispersion ($Disp^{R1}$) of 6.52 on a silica alumina of a ratio of 300:1 ($SAR_1$), the dispersion ($Disp^{R2}$) on a silica alumina of a ratio of 400:1 ($SAR_2$) is estimated to be $$Disp^{R2} = Disp^{R1} * (SAR_2/SAR_1)^{1/3}$$
$$= 6.52 * (400/300)^{1/3} = 6.52 * 1.1 = 7.17$$

Figure 2:
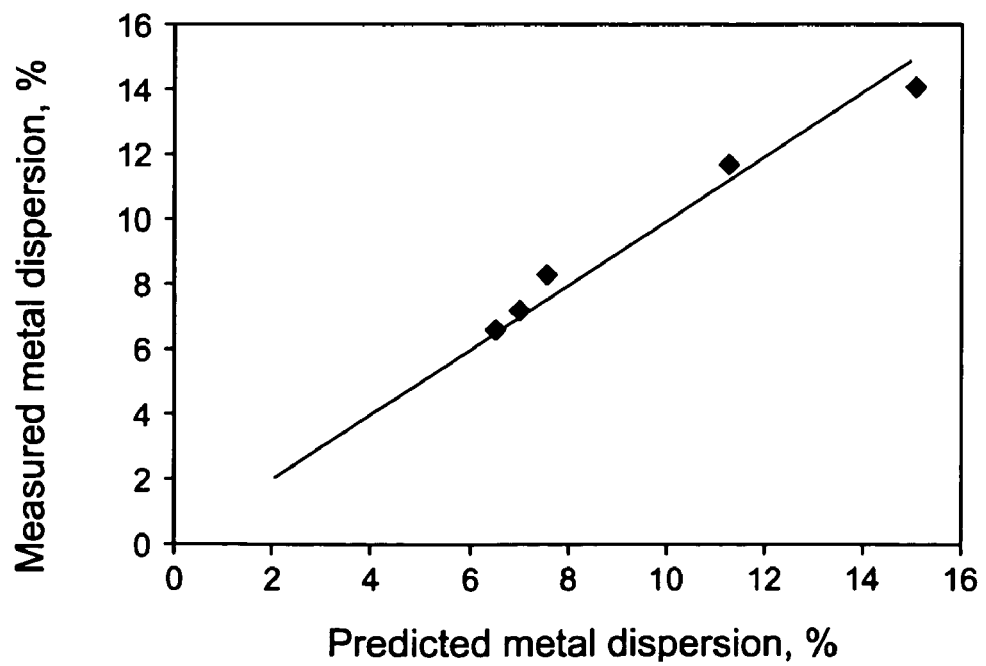
FIG. 2 depicts the predicted versus measured dispersion for cobalt-based catalysts supported on silica-alumina supports with an average pore size of 8 nm and with different silica to alumina ratios.

This procedure was used to predict the dispersion for the examples in Table 2. For each row, the dispersion was predicted using the row above and below (except for the first row, for which only the data from the row next to them was used). The results are shown in FIG. 2. It is illustrated in FIG. 2 that there is a very good correlation between predicted and measured dispersion. Such good correlation means that the predominant mechanism in the formation of the crystallites was the number of chemical "anchors" (serving as nucleation centers), which are alumina acid sites of the support. Such illustration demonstrates that the acid site density in the support, in the case of these examples, modified by changing the silica to alumina molar ratio of the support was the major variable for the final dispersion of the impregnated catalyst active component.

Figure 3:
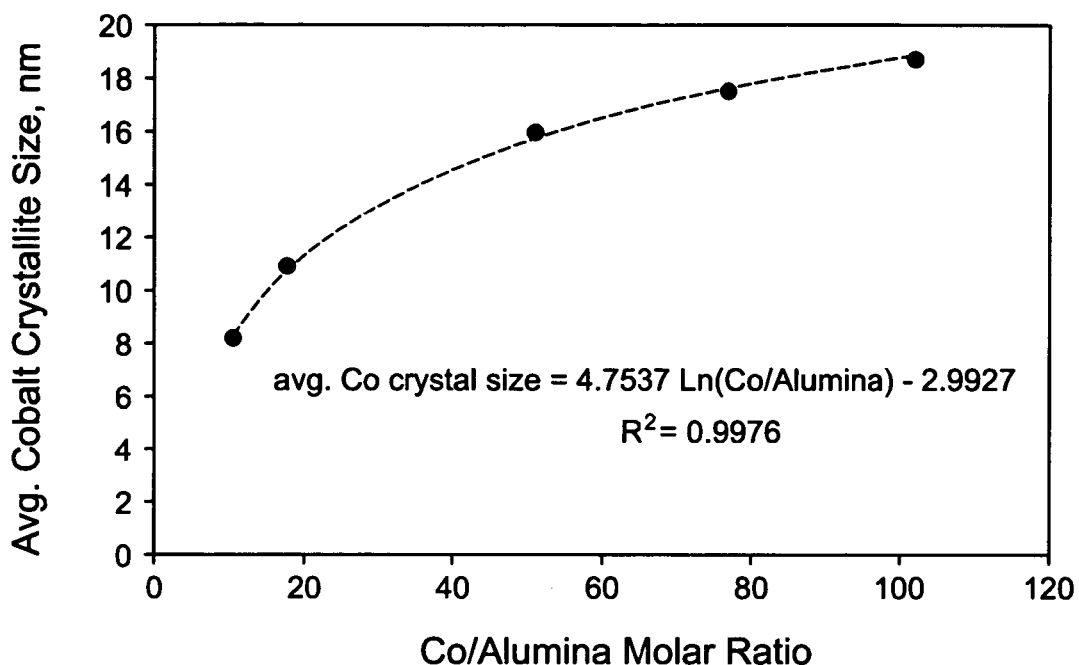
FIG. 3 is a plot of the average cobalt crystallite size as a function of the cobalt-to-alumina molar ratio for a cobalt-based catalyst supported on a silica-alumina support with an average pore size of 8 nm.

To further support this effect of the number of alumina sites on the dispersion of cobalt, the average cobalt crystallite size was plotted versus the molar ratio of cobalt to alumina as shown in FIG. 3. As it is clearly shown, the greater the molar ratio of cobalt to alumina, the bigger the average cobalt crystallite size on the support. A logarithmic regression analysis revealed a good correlation $y = a \ln(x) + b$ between the $Co:Al_2O_3$ molar ratio (x) and the average cobalt crystallite size (y) in the catalysts of EXAMPLES 10-14 with an average pore size of 8 nm, wherein a is equal to 4.7537 and b is equal to -2.9927. Therefore, with this correlation between the average crystallite size and the cobalt-to-alumina molar ratio, one can select a desirable average cobalt crystallite size and can determine which cobalt-to-alumina molar ratio should be used. One can first select a silica-alumina support with a specific silica-to-alumina ratio and estimate the appropriate amount of cobalt to load on that silica-alumina support, or one could first select a desirable cobalt loading on a silica-alumina support and determine what the silica-to-alumina molar ratio of that silica-alumina support should be to obtain the appropriate cobalt-to-alumina molar ratio in the catalyst.

Examples 16-23

Catalyst Preparation on Commercial Supports

Catalyst Examples 16-23 were made to illustrate that a cobalt based catalyst made from commercial supports typically has a metal dispersion dictated by the porous structure, such that the average cobalt crystallite size typically is equal to or smaller than the average pore size of commercially available silica supports. The supports chosen for these catalysts Examples 16 to 23 were purchased from Fuji Silysia Chemical Ltd. (Research Triangle Park, N.C., U.S.A.), Silycycle, Inc. (Quebec, Quebec, Canada), and Aldrich Chemical Company (Milwaukee, Wis., U.S.A.). The catalysts made to achieve the same cobalt and platinum loadings (20 wt. % Co and 0.014 wt. % Pt) were characterized in the same manner as previously described. The nominal pore size, the measured average pore size, the average cobalt crystallite size, metal dispersion, and metal surface area are shown in Table 3.

Example 16

A catalyst was prepared by adding sufficient amounts of cobalt nitrate hexahydrate and platinum acetyl acetonate to a silica support Q6 available from Fuji so as to achieve a catalyst with the composition of 20 wt. % Co/0.014 wt. % Pt. Cobalt nitrate (19.8 g of $Co(NO_3)_2.6H_2O$) was dissolved in about 15 mL of deionized water (about 30 mL of DI) and platinum acetylacetonate (0.0138 g of Pt(II) acetyl acetonate) was dissolved in acetone (about 1.5 mL). Both cobalt and platinum solutions were added to a sample (16 g) of the Fuji silica Q6 support in a mixing flask. The material was then placed in an oven so as to dry the material at 80° C. for 12 hours. The material was then was calcined in flowing air with a temperature ramp of 2° C./min and held at 275° C. for 4 hours. The air was metered fed through the fluidized bed at 700 standard cubic centimeters per minute (sccm). The temperature was ramped from ambient to 120° C. at 2° C./min and held at 120° C. for 1 hour. The resulting first catalyst intermediate was allowed to cool to room temperature. The above procedure was repeated until all of the catalytic material was deposited, except that the catalyst support was replaced by the first catalyst intermediate. Before testing, each catalyst was reduced in flowing hydrogen at 400° C. for 16 hrs. The reduction temperature was ramped at 2° C./min.

Example 17

The procedure of Example 16 was used except that a silica support Q10 from Fuji Silysia Chemical Ltd. was used.

Example 18

The procedure of Example 16 was used except that a silica gel MERCK GRADE 100 purchased from Aldrich Chemical Co was used.

Example 19

The procedure of Example 16 was used except that a silica gel DAVISIL™ GRADE 644 purchased from Aldrich Chemical Co was used.

Example 20

The procedure of Example 16 was used except that an ULTRA PURE SILICA GEL from Silicycle, Inc. was used.

Example 21

The procedure of Example 16 was used except that a silica support Q15 from Fuji Silysia Chemical Ltd. was used.

Example 22

The procedure of Example 16 was used except that a silica support Q30 from Fuji Silysia Chemical Ltd. was used.

Example 23

The procedure of Example 16 was used except that a silica support Q50 from Fuji Silysia Chemical Ltd. was used.

The nominal pore size as specified by the supplier of each of the supports, the measured average pore size obtained by the method of BJH nitrogen desorption, and the average crystallite size (for reduced cobalt) obtained by the method of x-ray diffraction (XRD) are shown in Table 3.

TABLE 3

| Ex. | Nominal Avg. pore, nm | Measured Avg. Pore size, Nm | Av. Crystallite size, nm |
|---|---|---|---|
| 16 | 6 | 5.4 | 6 |
| 17 | 10 | 14.4 | 9 |
| 18 | 10 | 10.3 | 9 |
| 19 | 15 | 12.4 | 10 |
| 20 | 15 | 10.3 | 11 |
| 21 | 15 | 16.5 | 12 |
| 22 | 30 | 35.6 | 15 |
| 23 | 50 | 54.8 | 17 |

Examples 24-25

Influence of the Pore Size

To further ascertain the influence of the pore size, a support was prepared with an average pore size lower than that of Examples 3 to 8, all of whom have an average pore size diameter of 8 nm. The targeted average pore size was 7 nm. To prepare this support Example 24, the procedure of Example 1 was used except that the amounts of sodium aluminate and sodium silicate were selected so as to produce a molar ratio of silica to alumina of 100:1, and the gelation pH needed to obtain an average pore diameter of 7 nm for this specific silica to alumina molar ratio was 10.5. A catalyst (Example 25) with 20 wt. % Co and 0.014 wt. % Pt was prepared using this support with a silica-to-alumina molar ration of 100:1 using the same procedure as that described in Example 10. The support characterization and the catalyst characterization are shown in Table 4 and Table 5.

TABLE 4

| Support Ex. | $SiO_2:Al_2O_3$ molar ratio | Gelation Ph | BET Surface area, $m^2/g$ | Pore volume, cc/g | Avg. Pore Diameter, nm |
|---|---|---|---|---|---|
| 24 | 100 | 10.50 | 420 | 0.90 | 7.0 |

TABLE 5

| Catalyst Ex. | Cobalt:$Al_2O_3$ Molar Ratio | Avg. Co Crystallite Size, nm | Metal (Co) Dispersion % | Metal (Co)__ Surface Area, $m^2/g$ |
|---|---|---|---|---|
| 25 | 25.9 | 9.93 | 10.02 | 13.6 | the measured metal dispersion for Example 25 was 10% on the support comprising a silica-to-alumina ratio of 100:1 and a 7-nm average pore size. The expected dispersion using a silica to alumina ratio of 100:1 support with a 8-nm average pore size as extrapolated in FIG. 1 should have been about 12.2 nm with a silica-to-alumina ratio of 100:1. Therefore, it is noted that the narrowing of the average pore size, while keeping the silica to alumina molar ratio constant, produced a smaller average cobalt crystallite size while maintaining the expected metal dispersion. The silica to alumina molar ratio needed to reach the average cobalt crystallite size of 9.9 nm had we kept the average pore size constant to 8 nm would have been a value of about 56:1.

This Example 25 illustrates that when modifying the silica-alumina support to achieve a desired silica to alumina molar ratio, the change in the average pore size must not be allowed to be of such magnitude as to have a greater influence than the silica-to-alumina ratio (or the cobalt-to-alumina ratio) on the average cobalt crystallite size.

Figure 4:
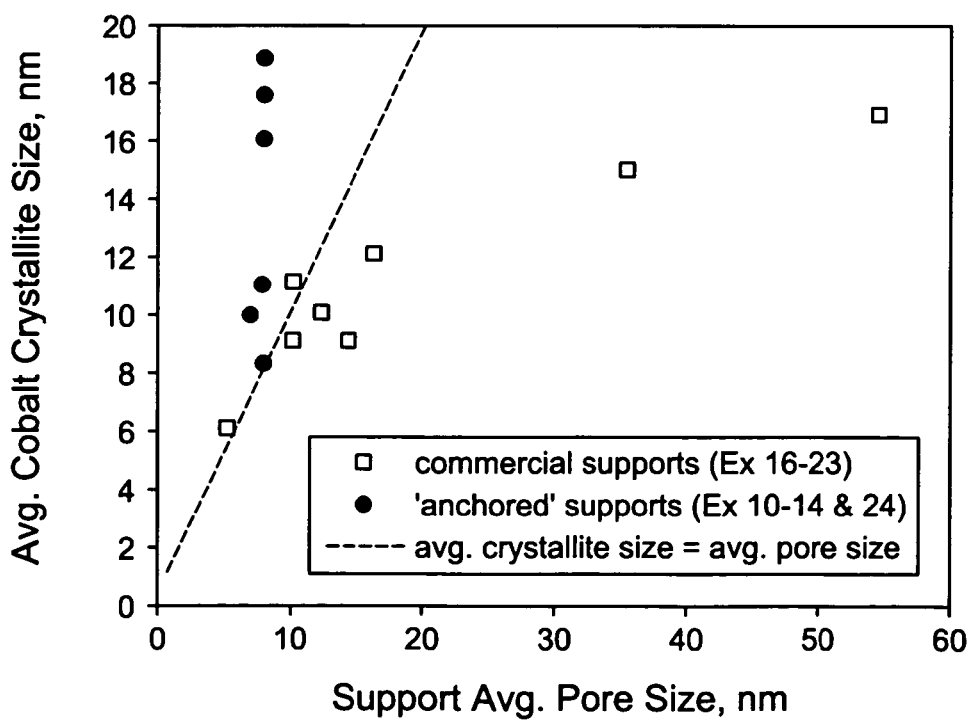
FIG. 4 is a plot of the average cobalt crystallite size as a function of the average pore size of commercially available supports as well as supports according to this invention to illustrate the effect of the chemical 'anchor' technique on optimizing metal dispersion regardless of pore size.

FIG. 4, which includes the data provided in Table 2 for Examples 10-14, in Table 3 from Examples 16-23, and in Table 4 for Example 24 provides an illustration of the dependence of the average cobalt crystallite size of the catalysts Examples 16-23 on the average pore size of their respective commercial supports employed while it also illustrates that the average cobalt crystallite size in catalyst Examples 10-14 employing the "anchored" supports according to this invention was not dependent of the average pore size of the silica-alumina "anchored" supports. As FIG. 4 shows, the average cobalt crystallite size was a strong function of average pore size for the commercial supports; that is, the average pore size for the commercial supports was typically larger than the average cobalt crystallite size, and the average cobalt crystallite size was typically limited by the support average pore size. On the other end, for the catalysts employing the "anchored" supports, the average cobalt crystallite size was greater than the average pore size of 8 nm of these "anchored" supports. The average cobalt crystallite size was only dependent on the amount of the alumina present in the silica-alumina "anchored" supports (or since the total cobalt loading was the same for all these "anchored" catalysts, was only dependent on the Co-to-alumina molar ratio in the catalyst).

Examples 26-27

Catalyst Performance

Examples 26 and 27 illustrate the performance of the catalysts of Examples 10-14 and 19 (as a 'typical' catalyst) in the Fischer-Tropsch reaction.

Example 26

Fixed Bed Testing

The catalysts of Examples 11-13 and 19 were tested in a fixed bed reactor. Each catalyst was activated in situ by heating the catalyst to 350° C. with a ramp of 2° C./min and holding for 16 hours in flowing hydrogen gas. The reaction conditions included a temperature of 220° C., a pressure of 347 psig, a space velocity of 6 normal liters per hour per gram catalyst, and a hydrogen to carbon monoxide ratio in the feed stream of 2.02. The % of moles of carbon monoxide converted, the $C_{5+}$ productivity, and the methane ($C_1$) weight percent as a weight % of hydrocarbon product were measured at 96 hours on stream. Results are shown in Table 6.

TABLE 6

| Catalyst Ex. | Support | CO Conv. (%) | $C_{5+}$ prod. (g/h/kg cat) | $C_1$ (wt %) |
|---|---|---|---|---|
| 11 | $SiO_2$:$Al_2O_3$ 300:1 | 42 | 412 | 11.0 |
| 12 | $SiO_2$:$Al_2O_3$ 200:1 | 45 | 440 | 10.6 |
| 13 | $SiO_2$:$Al_2O_3$ 70:1 | 64 | 614 | 12.9 |
| 19 | $SiO_2$ | 35 | 328 | 9.8 |

Example 27

Continuously Stirred Reactor Testing

The catalysts of Examples 10-14 were tested in a 100-milliliter stirred slurry autoclave reactor. Each catalyst was activated ex-situ by heating the catalyst to 400° C. with a ramp of 1° C./min and holding for 8 hours in a flowing stream of hydrogen gas. The reaction conditions included a temperature of 220° C. and a pressure of 350 psi (ca. 2,400 kPa). The run length was 240 minutes, and the reaction solvent was squalane. Results are shown in Table 7.

It can be seen from Table 7 that the catalysts of Examples 10, 11, 12, 13, and 14 peformed quite well as Fischer-Tropsch catalysts. While not wishing to be limited by the present interpretation, the inventors believe that this improved performance is due not only to the controlled dispersion, and therefore its associated activity and deactivation rate, but also due to the beneficial metal support interaction between the Fischer-Tropsch metal and the silica-alumina support.

TABLE 7

| | CO Conv. (%) | | CH4 (wt. %) |
|---|---|---|---|
| Example | 2.5 hr. | 4 hr. | 4 hr. |
| 10 | 68.0 | 28.1 | 8.7 |
| 11 | 74.2 | 37.8 | 5.9 |
| 12 | 88.7 | 47.5 | 8.8 |
| 13 | 91.0 | 52.7 | 5.2 |
| 14 | 53.4 | 44.1 | 7.9 |

The examples demonstrate that by varying the silica to alumina molar ratio of the support for a selected catalytic metal loading or by varying the catalytic metal to alumina molar ratio, while keeping the physical properties constant (constant average pore size), manipulation of the active metal dispersion and therefore its metal area per unit mass of catalyst and ultimately its performance were accomplished.

The inventors believe that these teachings can also be used on other metal oxides or combination of metal oxides in which at least a portion of the metal precursor may ion exchange (in the case of the silica-alumina supports, on the alumina acid sites) during the incipient wetness impregnation step or other impregnation techniques such as vacuum impregnation and/or drying, and the like, therefore creating "anchors" around which the crystallite may form. In the examples, the number of acid sites is related to the alumina-to-silica ratio of the supports.

While preferred embodiments of this invention have been shown and described, modifications thereof can be made by one skilled in the art without departing from the spirit or teaching of this invention. The embodiments described herein are exemplary only and are not limiting. Many variations and modifications of system and methods are possible and are within the scope of the invention. Accordingly, the scope of protection is not limited to the embodiments described herein but is only limited by the claims that follow, the scope of which shall include all equivalents of the subject matter of the claims.

The invention claimed is:
1. A catalyst comprising:
a porous composite support comprising a first element and a second element with a molar ratio of the first element to the second element between about 3:1 and about 1,000:1, wherein the first element comprises silicon, titanium, zirconium, thorium, cerium, aluminum, boron, oxides thereof, or any combination thereof and wherein the second element comprises aluminum, titanium, zirconium, tungsten, molybdenum, sulfate, boron, gallium, scandium, oxides thereof, or any combination thereof; and a catalytic metal comprising catalytic metal crystallites deposited on said porous composite support, wherein the catalytic metal comprises cobalt, iron, ruthenium, nickel, or combinations thereof and wherein the catalytic metal comprises between about 10 and about 40 wt. % of the total catalyst weight and further wherein the catalytic metal average crystallite size is between about 6 nm and about 25 nm;

wherein the support is made in a manner effective in distributing species of said second element amongst species of said first element;

wherein the porous composite support has an average pore size between 5 nm and 40 nm a surface area of between about 275 and about 600 m²/g;

wherein the porous composite support is made by a sol-gel method and the sol-gel method comprises: mixing a compound of the first element and a compound of the second element under conditions effective for providing a homogeneous hydrogel comprising the molar ratio of the first element to the second element; aging the hydrogel; and treating the hydrogel to form the porous composite support, wherein the treating comprises drying and calcining in air;

wherein the catalyst has a molar ratio of said catalytic metal to said second element between about 2:1 and about 1,000:1;

wherein species of said second element serve as nucleation centers for said catalytic metal crystallites; and wherein the catalyst further comprises a promoter selected from the group consisting of silver, boron, ruthenium, rhenium, palladium, platinum, or any combination thereof.

2. The catalyst according to claim 1 wherein the first element comprises silica, and the second element comprises alumina.

3. The catalyst according to claim 2 wherein the porous composite support has a silica-to-alumina molar ratio between about 30:1 and about 500:1.

4. The catalyst according to claim 1 wherein the first element comprises zirconia, and the second element comprises titania.

5. The catalyst according to claim 1 wherein the first element comprises silica, and the compound of silica is sodium silicate; and wherein the second element comprises alumina, and the compound of aluminum is sodium aluminate.

6. The catalyst according to claim 1 wherein the catalytic metal is active for the synthesis of hydrocarbons from a mixture of hydrogen and carbon monoxide.

7. The catalyst according to claim 1 wherein the catalytic metal comprises cobalt.

8. The catalyst according to claim 7 wherein the second element is alumina.

9. The catalyst according to claim 8 wherein the catalyst has a cobalt-to-alumina molar ratio between about 5:1 and about 300:1.

10. The catalyst according to claim 8 wherein the catalyst has a cobalt-to-alumina molar ratio between about 10:1 and about 150:1.

11. The catalyst according to claim 1 wherein the porous composite support has an average pore size between about 5 nm and about 20 nm.

12. The catalyst according to claim 1 wherein the porous composite support has a surface area between about 300 and about 600 m²/g.

13. A Fischer-Tropsch catalyst comprising:

an amorphous silica-alumina support having an average pore size and a molar ratio of silica to alumina between about 3:1 and about 1,000:1 and wherein the amorphous silica-alumina support has an acidity index greater than about 6 and less than about 129; and cobalt crystallites with an average crystallite size deposited on said support, wherein the average crystallite size is greater than the average pore size of the support, and wherein the catalyst has a molar ratio of cobalt to alumina between about 2:1 and about 1,000:1;

wherein the cobalt comprises between about 5 and about 40 wt. % of the total catalyst weight and the average cobalt crystallite size is between about 6 nm and about 25 nm;

wherein the average pore size of the amorphous silica-alumina support is between about 5 nm and about 20 nm and further wherein the amorphous silica-alumina support has a surface area between 260 and 600 m²/g;

wherein the catalyst further comprises which comprises between about 0.001 and about 10 wt. % of the total catalyst weight, and wherein the promoter comprises silver, boron, ruthenium, rhenium, palladium, platinum, or any combination of two or more thereof.

14. The catalyst according to claim 13 wherein the silica to alumina molar ratio is from about 30:1 to about 500:1.

15. The catalyst according to claim 13 wherein the silica to alumina molar ratio is from about 40:1 to about 400:1.

16. The catalyst according to claim 13 wherein the catalyst has a molar ratio of cobalt to alumina between about 5:1 and about 300:1.

17. The catalyst according to claim 13 wherein the catalyst has a molar ratio of cobalt to alumina between about 10:1 and about 150:1.

18. The catalyst according to claim 13 wherein the amorphous silica-alumina support comprises low acidity silica-alumina.

19. The catalyst according to claim 13 wherein the support is homogeneous with respect to silica and alumina.

* * * * *